(12) United States Patent
Allawi

(10) Patent No.: US 9,594,736 B2
(45) Date of Patent: Mar. 14, 2017

(54) DISPLAY AND SELECTION OF BIDIRECTIONAL TEXT

(71) Applicant: Apple Inc., Cupertino, CA (US)

(72) Inventor: Adil Allawi, London (GB)

(73) Assignee: Apple Inc., Cupertino, CA (US)

( * ) Notice: Subject to any disclaimer, the term of this patent is extended or adjusted under 35 U.S.C. 154(b) by 270 days.

(21) Appl. No.: 14/052,655

(22) Filed: Oct. 11, 2013

(65) Prior Publication Data

US 2015/0106700 A1   Apr. 16, 2015

(51) Int. Cl.
| | |
|---|---|
| *G06F 17/00* | (2006.01) |
| *G06F 17/24* | (2006.01) |
| *G06F 17/22* | (2006.01) |
| *G06F 3/01* | (2006.01) |
| *G06F 3/023* | (2006.01) |
| *G06F 3/0488* | (2013.01) |

(52) U.S. Cl.
CPC .............. *G06F 17/24* (2013.01); *G06F 3/018* (2013.01); *G06F 3/0233* (2013.01); *G06F 3/04883* (2013.01); *G06F 17/2223* (2013.01)

(58) Field of Classification Search
CPC ....................................................... G06F 17/24
USPC ......................................................... 715/256
See application file for complete search history.

(56) References Cited

U.S. PATENT DOCUMENTS

| | | | | |
|---|---|---|---|---|
| 5,182,709 A | * | 1/1993 | Makus ................... | G06F 17/215 400/109 |
| 5,564,048 A | * | 10/1996 | Eick .......................... | G06F 8/24 |
| 5,802,539 A | * | 9/1998 | Daniels .................... | G06F 17/21 704/7 |
| 6,415,305 B1 | * | 7/2002 | Agrawal ............... | G06F 17/245 345/629 |
| 7,073,138 B2 | * | 7/2006 | Mirkin .................... | G06F 17/24 715/256 |
| 8,271,873 B2 | * | 9/2012 | El-Shishiny ............ | G06F 17/21 715/243 |

(Continued)

FOREIGN PATENT DOCUMENTS

WO         WO 0138957         5/2001

OTHER PUBLICATIONS

Richard Gillam, Unicode Demystified, 2003, Addison-Wesley, p. 164-165, 424-425, 430-431.*

(Continued)

*Primary Examiner* — Laurie Ries
(74) *Attorney, Agent, or Firm* — Downey Brand LLP

(57) ABSTRACT

Techniques are disclosed for editing bidirectional text, including techniques for creating, selecting, inserting, and copying bidirectional text. The disclosed techniques include a method of inserting a character in bidirectional text. The method includes receiving the character, identifying a caret location at which a visual text insertion caret is positioned in displayed bidirectional text, the caret location separating a left character and a right character having opposite text directions, determining a logical insertion location at which the character is to be stored in a data store, wherein the logical insertion location is based on logical locations of the left and right characters in the data store, a text direction of the received character, and text directions of the left and right characters, and inserting the character into the data store at the logical insertion location.

20 Claims, 17 Drawing Sheets

(56) References Cited

U.S. PATENT DOCUMENTS

| | | | | |
|---|---|---|---|---|
| 2002/0143825 A1* | 10/2002 | Feinberg | G06F 17/2223 | 715/210 |
| 2006/0265649 A1* | 11/2006 | Danilo | G06F 17/2217 | 715/256 |
| 2009/0144666 A1* | 6/2009 | Lu et al. | | 715/859 |
| 2009/0228842 A1* | 9/2009 | Westerman | G06F 3/04883 | 715/863 |
| 2010/0174610 A1* | 7/2010 | Del Real | G06F 17/30058 | 705/14.73 |
| 2011/0238495 A1* | 9/2011 | Kang | G06Q 30/02 | 705/14.49 |
| 2011/0252304 A1* | 10/2011 | Lemonik | G06F 17/2247 | 715/234 |
| 2012/0007802 A1* | 1/2012 | Doi | G06F 3/018 | 345/157 |
| 2012/0030566 A1* | 2/2012 | Victor | | 715/702 |
| 2013/0147707 A1* | 6/2013 | Li | G06F 3/033 | 345/157 |
| 2014/0195901 A1* | 7/2014 | DeBlois | G06Q 30/02 | 715/256 |
| 2014/0258852 A1* | 9/2014 | Sesum | G06F 17/275 | 715/256 |
| 2015/0002527 A1* | 1/2015 | Chedeau | G06T 11/60 | 345/581 |
| 2015/0006505 A1* | 1/2015 | Plakhov | G06F 17/30867 | 707/710 |

OTHER PUBLICATIONS

Richard Gillam, Unicode Demystified, 2003, Addison-Wesley, p. 48, 164-165, 424-425, 430-431.*

Potel, "MVP: Model-View-Presenter the Taligent Programming Model for C++ and Java." Taligent Inc., 14. pp. (1996) (http://www.wildcrest.com/Potel/Portfolio/mvp).

"Java SE Documentation." http://docs.oracle.com/javase/7/docs/technotes/guides/2d/spec/j2d-fonts.html, 12 pp. (retrieved Nov. 18, 2013).

* cited by examiner (1a) .Back to English...

$x$ (1b) This sentence is in English.هذه الجملة باللغة العربية| Back to English...

$y$ $z$ (1c) 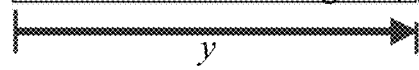.| Back to English...

$y$ (2a) This sentence is in English.هذه الجملة باللغة العربية.|ack to English...

$a$ (2b) This sentence is in English.|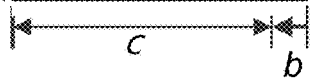ack to English...

$c$ $b$ (2c) This sentence is in English.|هذه الجملة باللغة العربيةack to English...

$b$ (3a) This sentence is in English.هذه الجملة باللغة العربية. to English...

$d$ (3b) This sentence is in English.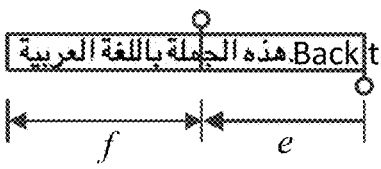 to English...

$f$ $e$ (3c) This sentence is in English.|هذه الجملة باللغة العربية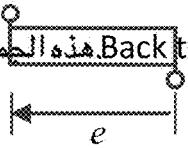 to English...

Cursor is within a BiDi-only character run or a new paragraph

Cursor between a BiDi letter and a BiDi number

Cursor between a non-BiDi letter and a BiDi number

Cursor between a non-Bidi letter and a BiDi letter

Caret position = 10,
leadingEdge=no

DISPLAY AND SELECTION OF BIDIRECTIONAL TEXT

TECHNICAL FIELD

The present invention relates generally to the use of bidirectional text in computer systems. More particularly, the present embodiments relate to receiving, displaying, and editing text in bidirectional languages.

BACKGROUND

In languages such as Arabic and Hebrew, text is predominantly displayed from right to left, but certain portions of the text, such as numbers, are displayed from left to right. Some characters, such as symbols, can be displayed in either direction, depending upon the direction of the enclosing text. Such text is said to be bi-directional, since it can contain text in two different directions. Bi-directional text can present problems in computer applications such as word processors. For instance, text is ordinarily represented as a sequence of consecutive numeric codes in computer memory, but when bidirectional text is displayed on a computer screen and manipulated, counterintuitive behavior can result. This counterintuitive behavior can result because bidirectional text is often stored using a memory layout referred to as "logical order," and presented, selected, or manipulated in this order. This technique is relatively simple to implement. However, use of the logical order can result in visual discrepancies. Software, such as word processors or text editors, highlights text that is being selected for operations such as copying. A user can select a block of text by clicking or touching a location in the text to specify one end of a selection, and dragging the other end of the selection across the desired text. The software ordinarily attempts to maintain the selection across the logical order of the text. For example, if there is a run of text going from left to right adjacent to another run going from right to left, a user can select across the left to right run, and the selection remains contiguous. However, when the selection crosses the border between the two runs, the selection splits, and the selection continues with the first letter of the right to left text going forward, and the result is that two portions of text are selected. This behavior can be a usability problem, because displaying a selection of characters that does not match the characters the user selected can cause confusion. On touch screen devices, the user makes the selection by moving a finger across the screen to position selection handles, but the selection can jump from one part of the text to another. Effects such as the selection splitting or selection boundary handles jumping from one side to the other can be disconcerting for users.

SUMMARY

In one or more embodiments, user interface features are provided to enable editing of bidirectional text using a visual insertion point and a visual selection mechanism. The bidirectional text can include both right-to-left and left-to-right text, e.g., English text interspersed with Arabic text. The visual insertion point, also referred to herein as a visual caret or cursor, indicates a point in the text at which characters are to be inserted. The visual selection mechanism can accurately display a selection of bidirectional text as a single block of contiguous characters, and can insert typed characters at the location of the visual caret regardless of the directions of text to the left and right of the caret.

In previous bidirectional text editors, selecting text that crosses a boundary between right-to-left and left-to-right portions can result in the selection cursor jumping across the right-to-left text to another boundary, even though the user did not move the selection cursor to that boundary. At such boundaries, characters that appear adjacent to each other on the screen are not necessarily stored in adjacent locations in memory, and previous text editors move the cursor and selection based on the locations in memory, which can result in the cursor unexpectedly jumping to another block of text, or the selection splitting into multiple selections, which can be confusing to users. The bidirectional text editing techniques disclosed herein operate in a more user-friendly manner, with cursors, insertions, selections, and other editing operations behaving in accordance with user commands.

BRIEF DESCRIPTION OF THE DRAWINGS

The included drawings are for illustrative purposes and serve only to provide examples of possible structures and arrangements for the disclosed inventive apparatuses and methods for providing portable computing devices. These drawings in no way limit any changes in form and detail that may be made to the invention by one skilled in the art without departing from the spirit and scope of the invention. The embodiments will be readily understood by the following detailed description in conjunction with the accompanying drawings, wherein like reference numerals designate like structural elements, and in which:

FIG. 1 shows examples of the behavior of a word processor that uses logical ordering and a word processor that uses the visual ordering techniques in accordance with one or more embodiments.

DETAILED DESCRIPTION

Figure 2A:
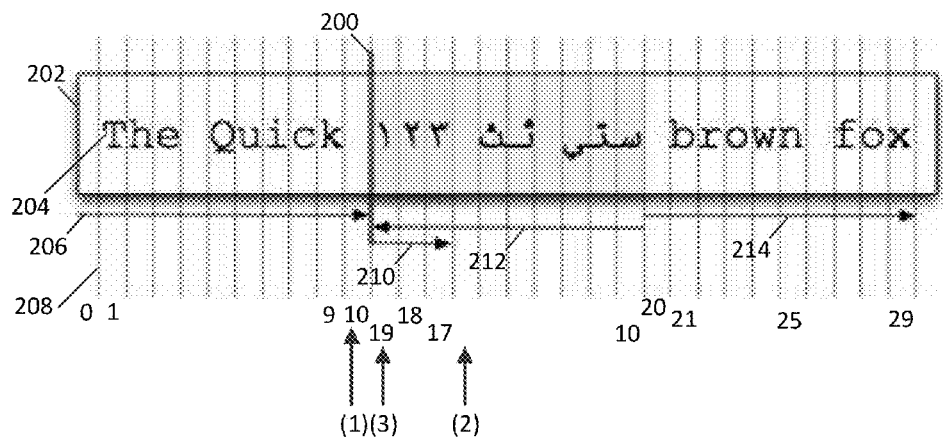
FIG. 2A is an illustrative drawing of a visual caret that can represent one of three logical positions relative to a boundary between left-to-right and bidirectional text in accordance with one or more embodiments.

Representative applications of apparatuses and methods according to the presently described embodiments are provided in this section. These examples are being provided solely to add context and aid in the understanding of the described embodiments. It will thus be apparent to one skilled in the art that the presently described embodiments can be practiced without some or all of these specific details. In other instances, well known process steps have not been described in detail in order to avoid unnecessarily obscuring the presently described embodiments. Other applications are possible, such that the following examples should not be taken as limiting.

The following relates to a portable computing device such as a laptop computer, net book computer, tablet computer, etc. The portable computing device can include a multi-part housing having a top case and a bottom case joining at a reveal to form a base portion. The portable computing device can have an upper portion (or lid) that can house a display screen and other related components whereas the base portion can house various processors, drives, ports, battery, keyboard, touchpad and the like. The base portion can be formed of a multipart housing that can include top and bottom outer housing components each of which can be formed in a particular manner at an interface region such that the gap and offset between these outer housing components are not only reduced, but are also more consistent from device to device during the mass production of devices. These general subjects are set forth in greater detail below.

In one or more embodiments, user interface features are provided to enable editing of bidirectional text using a visual insertion point and a visual selection mechanism. The bidirectional text can include both left-to-right and right-to-left and text, e.g., English text interspersed with Arabic text. The visual insertion point, also referred to herein as a visual caret or cursor, indicates a point in the text at which characters are to be inserted. The visual selection mechanism can accurately display a selection of bidirectional text as a single block of contiguous characters.

In previous bidirectional text editors, selecting text that crosses a boundary between right-to-left and left-to-right portions can result in the selection cursor jumping across the right-to-left text to another boundary, even though the user did not move the selection cursor to that boundary. At such boundaries, characters that appear adjacent to each other on the screen are not necessarily stored in adjacent locations in memory. Previous text editors move the cursor and selection based on the locations in memory, which can result in the cursor unexpectedly jumping to another block of text, or the selection splitting into multiple selections, which can be confusing to users. The bidirectional text editing techniques disclosed herein operate in a more user-friendly manner, with cursors, insertions, selections, and other editing operations behaving in accordance with user commands.

FIG. 1 shows examples of the behavior of a word processor that uses logical ordering and a word processor that uses the visual ordering techniques in accordance with one or more embodiments. The examples, labeled (1a)-(3c), each use the same text, which consists of a block of English text followed by a block of Arabic text followed by another block of English text. Example (1a) shows the effect of selecting the first block of English text in an existing word processor that constructs the selection using a logical ordering of the characters, which corresponds to the order in which the text is stored in memory. The arrow labeled x represents the motion of a cursor in a selection operation, i.e., from the beginning to the end of the first English block. The selected text is shown in a rectangular box. In this example, the first English block is highlighted to indicate that it is selected, as a user would expect. Example (1b), however, shows that when the selection is then extended one character further to the right, crossing the boundary between the English and Arabic text, the highlight splits into two sections y and z. Sections y and z are initially adjacent to each other, but can be separated visually by moving the end of one of the selections away from the boundary. The term "highlight" as used herein indicates that the selected characters are visually distinguished from non-selected characters. The highlighting of selected characters can be done by, for example, displaying the selected characters with a background color that differs from the background color of the unselected text. In that way, a rectangle is drawn behind the selected characters. The highlight can extend across lines, in which case it visually splits at the beginning or end of a line and continues at the end or beginning of the previous or next line, respectively. The logical selection, however, does not ordinarily split at the beginning or end of displayed lines of text. The rectangles drawn around the selected text in FIG. 1 are examples of text highlighting that indicates selections. On a display screen, the rectangles can be filled in with a color that differs from the background color of the unselected characters. The highlighting or rectangles of FIG. 1 can expand as the user selects more characters, or contract as the user selects fewer characters. Referring again to the example, the two sections y and x are separated by the vertical dotted line, which is not shown on the display. The first section covers the English text, and the second section covers the Arabic text. When the split occurs, the entire block of Arabic text z is automatically selected, even though the user did not move the cursor to the end of the Arabic text. This behavior is a result of the selection being determined using the logical ordering. When the first Arabic character after the English period is typed, that Arabic character is stored in memory immediately following the English period. However, since the subsequent Arabic characters are inserted to the left of the first Arabic character, the subsequent characters appear between the English period and the first Arabic character. Thus, when the selection cursor is moved across the boundary following the period character, the selection extends to the next character in the logical order, which is the rightmost character in the Arabic text, as described above. The entire block of Arabic text is therefore selected as shown by the box in Example (1b), even though the cursor was not moved to the end of the Arabic text. Example (1c) shows a visual selection extended to include one Arab character, as the user requested by the action across the distance x. The characters selected by the user, and no others, are included in the selection in Example (1c). The behavior shown in Example (1c) is produced by the visual selection techniques described herein.

Examples (2a) and (2b) show behavior of existing text editors, similar to that described above, but with the selection being made in a right to left direction, as shown by the arrows a and b. In Example (2a), the letter B is initially selected, as shown by the rectangle around the B character. Next, the selection is extended to the left by one character, thus crossing the boundary to the Arabic text and causing the selection to split. As the split occurs, the entire block of Arabic text (c) is selected, even though the user only selected the single Arabic character included in distance b, as shown by the box in Example (2b). Example (2c) shows a visual selection extended to the left to include one Arab character, as the user requested by the action across the distance b. The characters selected by the user, and no others, are included in the selection in Example (2c). The behavior shown in Example (2c) is produced by the visual selection techniques described herein.

Selection splitting behavior can also occur in existing word processors, text editors, and the like, on devices with touch screen inputs. Example (3a) shows a selection of the English word Back on a touch screen device. The initial selection d is then extended to the left in Example (3b) to form a larger selection e. The arrow labeled e shows the distance by which the user moved a finger to extend the selection. The user did not extend the selection through the distance f up to the leftmost character of the Arabic text. However, the selection split into two adjacent selections e and f when the selection was extended across the boundary between the English and Arabic text. When the split occurred, the second selection automatically extended to the left through distance f to include the leftmost character, as can be seen by the selection box around the entire block of Arabic text. The selection was split and extended because the leftmost character of the Arabic text is the character that is actually adjacent to the letter B in the logical ordering in memory, and selecting the leftmost Arabic character caused all of the characters across f in memory between the leftmost Arabic character and the left end of the previous selection (the letter B) to be selected. Example (3c) shows a visual selection extended to include several, but not all, Arab characters, as the user requested by the action across the distance e. The characters selected by the user, and no others, are included in the selection in Example (3c). The behavior shown in Example (3c) is produced by the visual selection techniques described herein.

There can be additional counterintuitive results of displaying text according to the logical ordering, such as characters being inserted at unexpected locations in the text that are not adjacent to the cursor. It would be desirable, therefore, to display and enable users to manipulate bidirectional text in a more intuitive way.

FIG. 2A is an illustrative drawing of a visual caret 200 that can represent one of three logical positions relative to a boundary between left-to-right and right-to-left text in accordance with one or more embodiments. The caret 200 indicates a position in the text 202 at which text is to be inserted or deleted, e.g., when the user presses a key. Note that the caret 200 is also referred to herein as an insertion point or cursor. The caret 200 can be moved to a position adjacent to any character of text 202, such as position 208 adjacent to character 204. A user can move the caret 200 using, for example, arrow keys, a mouse pointer, touch input, or the like. When a user enters a text character 204, e.g., by pressing a key, invoking a paste command, or using some other input method, a visual representation of the text character 204 is inserted into the text 202 at a location based on the position of the caret 200, the type of text adjacent to the caret 200, and the input language of the keyboard, as described in more detail below.

Groups of contiguous characters can be referred to as runs or blocks. There are three types of text in the text 202: left-to-right runs of English text 206 and 214, a right-to-left run of Arabic text 212, and left-to-right run of Arabic numbers 210 in the right-to-left run of Arabic text 212. That is, the left-to-right run of Arabic numbers 210 is a sub-run of the right-to-left run of Arabic text 212. The runs begin at offset positions that are numbered in accordance with the logical order of the characters, which differs from the visual order shown in FIG. 2A. Visual order can be defined as left-to-right regardless of the direction associated with the text, since visual order is the order of the characters as they appear on the screen, and the characters on the screen can be traversed from left to right for explanatory purposes or to be drawn on the display. That is, the logical order is the order in which the characters are stored in memory, and the visual order is the order in which the characters are displayed. The logical offsets of certain characters are shown as numeric values below the text. The first run of text 206 is English text and is therefore left-to-right. The logical numbering of the first run is the same as the visual ordering: the letter T is located at offset 1, the letter k is located at offset 9, and the space following the k is located at offset 10. The second run of text 212 is Arabic text, and is therefore right-to-left. Since the text is right-to-left, characters are added to the left. Reading the Arabic text 212 from right-to-left, the first character of the run of Arabic text 212 is located at offset 11, and subsequent characters of the run are added to the left of offset 11. There are 10 characters in the run of Arabic text 212, starting at offset 11 and ending at offset 20, which is adjacent to the caret 200. Since the last three characters in the run 212 are numbers, they are in a left-to-right sub-run 210 of the run 212. The English run of text 214 is left-to-right, starts at offset 21, and ends at offset 30.

In the example of FIG. 2A, the caret 200 is positioned at a point where the three runs 206, 210, 212 meet, which is a boundary between the run of English text 206, the run of Arabic text 212, and the run of Arabic numbers 210. The caret 200 at the boundary shown can represent three different positions in the backing store (e.g., in memory). The position of the caret 200 at the meeting point of three runs can mean one of the following: (1) the actual position of the caret is the end of the first run of English text (offset 10), (2) the actual position of the caret is at the beginning of the run of Arabic numbers (offset 17), or the actual position of the caret is at the end of the Arabic text run (offset 20). When the caret 200 is at the location shown, and the user types a character, the location at which the character appears depends on whether the character is a letter or number, and whether the character is in a left-to-right or right-to-left language.

If the user types an English letter, the English letter should be associated with the English run, and appear to the immediate right of the space at offset 10, which is labeled (1). If a user instead types an Arabic letter, the letter appears at the caret, and is stored in the backing store the Arabic number 3. If a user types an Arabic number, the number appears to the immediate right of the caret 200, i.e., before the Arabic number at offset 20 (note that the values of the three Arabic numbers are 1, 2, and 3). Thus, there are three different positions in the text and in the backing store that a single character insertion could place a character. Each of these positions has its own possible offset into the text in the backing store (i.e., in memory). The caret mechanism uses the character that the caret touches, and an indication of which edge of the character (or which edge of the glyph separate between characters) the caret is on—either the 'leading edge' or the 'trailing edge'.

Figure 2B:
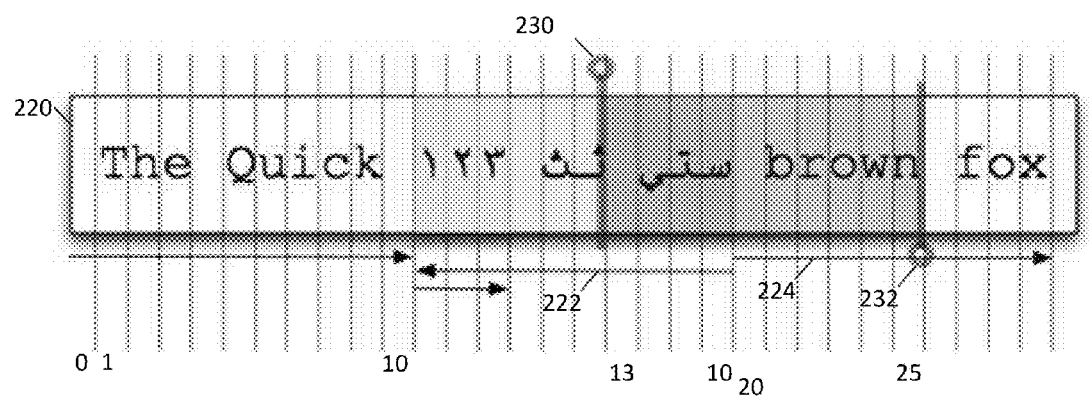
FIG. 2B is an illustrative drawing of a visual selection on a touch screen device in accordance with one or more embodiments.

FIG. 2B is an illustrative drawing of a visual selection on a touch screen device in accordance with one or more embodiments. The visual selections described herein do not exhibit the counterintuitive behavior of displayed selections not matching the characters that the user selected, characters being inserted in unexpected locations in the text, and so on. The counterintuitive behavior is avoided because, in one aspect, a visual selection is visually contiguous regardless of changes in direction of the underlying text. In the example of FIG. 2B, two runs of text are selected from a longer section of text 220. The first word of an Arabic run 222 and the first word of the following English run 224 are selected, and are visually adjacent. The selection includes are two ranges of text that are disconnected from each other in the backing store: the first Arabic word (at 10-13) and "brown" (at 20-25). The selection is adjacent to a beginning handle 230 and an end handle 232, which can be moved to adjust the boundaries of the selection.

Figure 3:
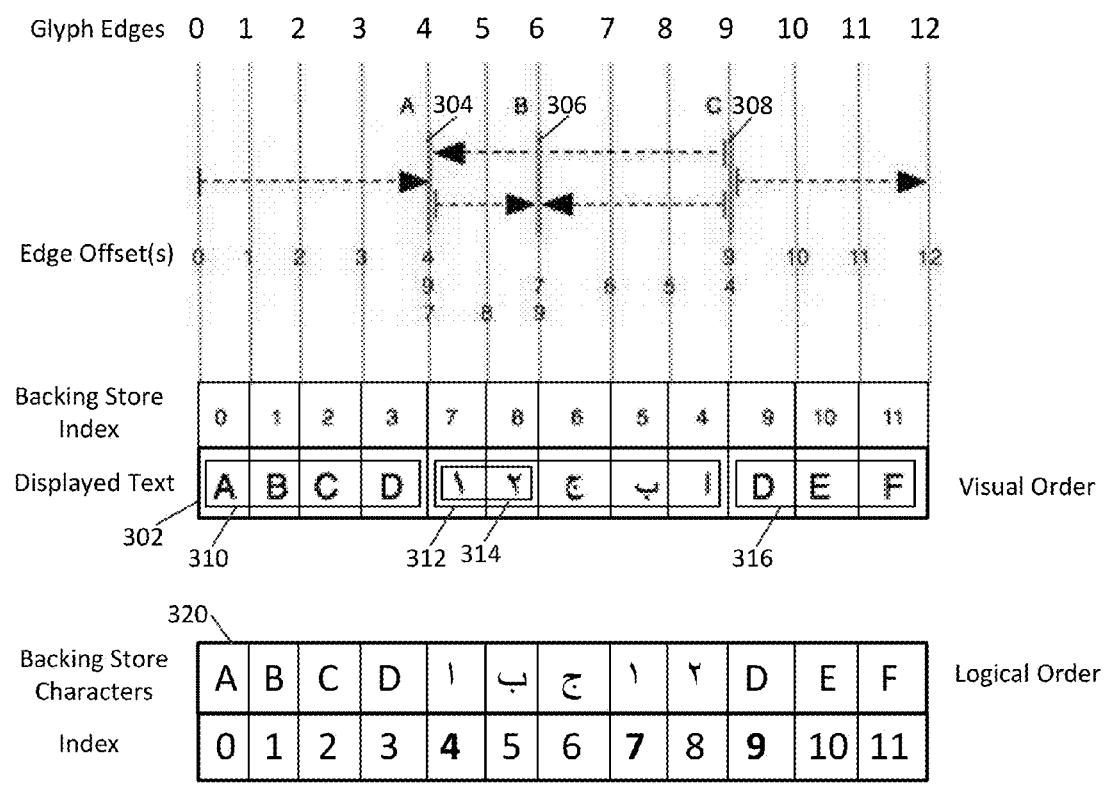
FIG. 3 is an illustrative drawing of a visual selection in accordance with one or more embodiments.

FIG. 3 is an illustrative drawing of visual selections of bidirectional text in accordance with one or more embodiments. FIG. 3 shows the correspondence between displayed text 302 that is arranged in a visual order and characters stored in a backing store 320 (e.g., memory) that are arranged in a logical order. The displayed text 302 is shown as it can appear on a display screen. Each of the displayed characters is mapped to a memory location in the backing store 320, which stores the actual values of the characters that are rendered to create the displayed characters. Backing store index numbers that identify the locations in the backing store 320 of the displayed characters are shown above the display text. The contents of the backing store 320 are shown below the displayed text. For example, the value of the character displayed between glyph edges 0 and 1, 'A', is stored at backing store location 0, which is also referred to herein as "logical index" 0. The character displayed on the screen can be understood as a visual rendering of the character value stored in the backing store at the location identified by the backing store index associated with the character's display position, which can be represented by a display index of 0. As another example, the Arabic number '1' is displayed between glyph edges 4 and 5, which can be understood as a display index 5 (not shown). Display indexes are not discussed in detail herein, since displayed characters are displayed from left to right, and the index of each displayed character is simply the position of the character in the displayed text. Note that the value of the Arabic number '1' displayed between glyph edges 4 and 5 is located in the backing store at backing store index 7 instead of index 4 as a result of the run of characters 312 having a right-to-left direction, as described elsewhere herein.

In FIG. 3, displayed text is shown between glyph edges, which correspond to boundaries between the displayed characters. The backing store index of each displayed character is shown above the displayed text, and the locations of the characters in the backing store are shown below the displayed text. FIG. 3 shows three runs of characters, including a first English run 310, a second run 312, which is right-to-left Arabic text with a sub-run 314 of left-to right numeric digits, and a second English run 316. Borders between the runs are shown as a border A 304, a border B 306, and a border C 308. A visual caret can be placed at any of the glyph edges. When a caret is placed at one of the visual border glyph edges A, B, or C, the caret can have multiple associated insertion positions. For example, if a caret is at border A, i.e., position 4 in the visual order, then, because of the border A, the caret can be at position 4, 9, or 7 in the backing store order. The caret position in the backing store is 4 if the caret is associated with the English run 310, in which case the caret means the end of the first English run 310, and additional English text is to be inserted at logical position 4. The caret position in the backing store is 9 if the caret is associated with the whole Arabic run 312, in which case the caret means the end of the Arabic text run 312, and addition Arabic text is to be inserted at logical position 9.

The position in the backing store is 7 if the caret is associated with the Arabic number sub-run 314, in which case the caret means the beginning of the sub-run 314, and additional Arabic numbers are to be inserted at logical position 7. Similarly, visual carets placed at positions B or C can have a subset of these possible backing store positions. A caret at position B can mean the end of the Arabic text run 312 or the beginning of the sub-run 314. A caret at position C can mean the end of the Arabic text run 312 or the end of the first English run 310. Similarly, a caret at border B, i.e., position 5 in the visual order, can be at position 7 or 9 in the backing store order, and a carat at border C, i.e., position 5 in the visual order, can be at position 9 or 4 in the backing store order.

Figure 4A:
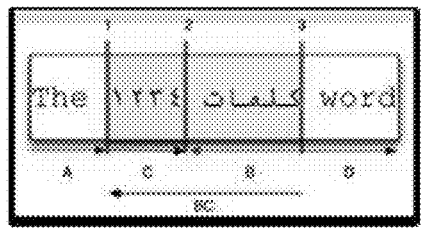
FIGS. 4A-4D are illustrative drawings of character insertion locations in accordance with one or more embodiments.

FIGS. 4A-4D are illustrative drawings of visual character insertion locations in accordance with one or more embodiments. FIG. 4A shows a scenario in which the caret (i.e., insertion point) is placed between a run of English text and a run of Arabic text. In accordance with one or more embodiments, characters can be inserted, deleted, selected, cut, copied, and pasted according to rules that result in the characters and selections appearing at positions the user expects. For example, when the techniques described herein are used in a word processor, the problems shown in FIG. 1, such as the display of split selections and selection of an entire run of text that includes characters not selected by the user, do not occur. Instead, in accordance with one or more embodiments, the selection is displayed as a single rectangle of contiguous characters that correspond to the characters the user selects, with no additional characters being selected. The same is true for touch screens. In accordance with one or more embodiments, the selection handles on touch screen devices are displayed at the true start and end of the selection. When using a visual selection, the start and end handles appear at the left and right ends of the selection, respectively, for left-to-right text, as a user would expect, unlike the examples of existing text editors shown in FIG. 1. Similarly, the start and end handles appear at the right and left ends of the visual selection, respectively, for right to left text.

In the example of FIG. 4A, the caret is placed at the specified point by a pointing device such as a mouse, or a touch screen input, and no input has been typed since the caret was placed. The text with the cursor placed between the two runs, E and A, is as follows:

E|A

In such an arrangement, although the caret visually indicates that text is to be inserted between the English and Arabic runs, existing logical ordering techniques insert text at different positions in the backing store for the same caret position, depending on invisible or difficult to see aspects of the context. Thus, the behavior of existing techniques when inserting characters at boundaries between text runs of different directions is unexpected and confusing to many users.

In one aspect, if a letter e is typed on a US keyboard, the English letter is inserted at the caret, and the caret moves to the right:

Ee|A

If an Arabic letter, denoted a, is typed on an Arabic keyboard starting from the same caret point, the Arabic letter is inserted at the caret at the same visual location as the English letter, but at a different location in the backing store than the position in which the English letter was inserted.

Ee|aA

Although the characters are inserted at different locations in memory, the techniques described herein display the characters at the same visual position in both cases. Similarly, when a user deletes a character, e.g., by pressing a backwards delete or backspace key, the deletion direction is determined similarly, so that the character that is deleted is the character that the user expects to be deleted. However, as with insertion, if the user types a character, the direction of deletion is set to the backing store direction (e.g., deleting characters to the left of the caret's location in the memory layout). The backing store deletion direction is opposite to the backing store typing direction. When characters are being typed and inserted into text, the characters are inserted in the backing store direction, e.g., by incrementing the backing store location for each character. This insertion in backing store direction is ordinarily what users expect when they type characters.

In one or more embodiments, copy and paste operations produce the results a user would expect when copying, cutting, and pasting text that includes both left-to-right and right-to-left text. For example, a copy or cut operation on a region of such text includes the entire selected text, which can be two or more runs located at different locations in the backing store, even though the selection visually appears to be a single rectangle. Pasting selected text that includes two or more runs also results in the text appearing as a single rectangle that has the same content as the text that was cut or copied, as the user would expect.

FIG. 4A shows a scenario in which the caret (i.e., insertion point) is within a bidirectional-only character run or a new paragraph. The bidirectional-only character runs are shown as a run C of Arabic numbers and a run B of Arabic letters in FIG. 4A. Run B has right to left alphabetic text, and run C has left-to-right numeric text. When a user types a bidirectional character, the position at which the character is inserted depends upon the type of the character. If the character is a bidirectional letter, then the character is inserted from right to left. If the character is a bidirectional number, the character is inserted from left to right. As the user types, the cursor is placed after each typed character. When a letter is typed, the cursor is placed to the left of the typed letter. When a number is typed, the cursor is placed to the right of the typed number.

Figure 4B:
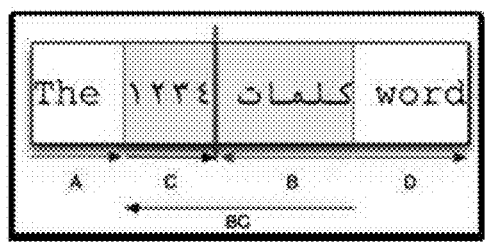

FIG. 4B shows a scenario in which the cursor is on a border between a bidirectional number and a bidirectional letter. The cursor is shown as a vertical line between runs C and B that extends above the text. If a bidirectional letter is typed, the letter is inserted at the end of the bidirectional text run B to the right of the cursor. If a bidirectional number is typed, the number is inserted at the end of the bidirectional number run C to the left of the cursor. If a non-bidirectional character, e.g., an English letter, is typed, the bidirectional run (BC) splits with run B to the right of the new non-bidirectional letter and run C to the left.

Figure 4C:
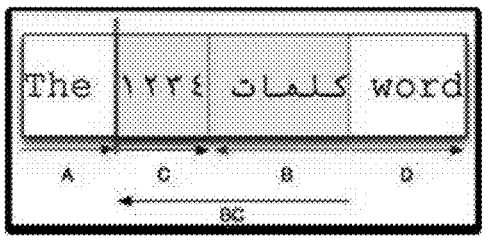

FIG. 4C shows a scenario in which the cursor is on a border between a non-bidirectional letter and a bidirectional number. The cursor is shown as a vertical line between runs A and C. If a non-bidirectional character is typed, the character is inserted at the end of the non-bidirectional run A to the left of the cursor. Subsequently-typed non-bidirectional characters are inserted left to right. If a bidirectional letter is typed, the letter is inserted at the end of the bidirectional character run BC to the right of the cursor. Subsequently-typed bidirectional characters are inserted right to left. If a bidirectional number is typed, the number is inserted at the beginning of the bidirectional number run to the right of the cursor. The cursor is then placed to the right of the inserted number. Subsequently-typed bidirectional numbers are inserted left to right.

Figure 4D:
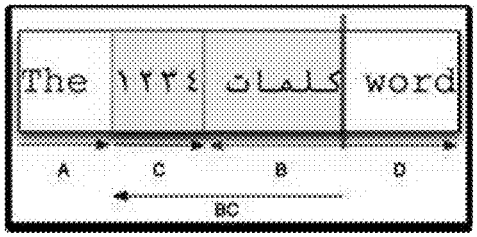

FIG. 4D shows a scenario in which the cursor is on a border between a non-bidirectional letter and a bidirectional letter. The cursor is shown as a vertical line between B and D. If a non-bidirectional character is typed, the character is inserted at the beginning of the non-bidirectional run D to the right of the cursor. Subsequently-typed non-bidirectional characters are inserted left to right. If a bidirectional letter is typed, the letter is inserted at the beginning of the bidirectional character run B to the left of the cursor. Subsequently-typed bidirectional characters are inserted right to left. If a bidirectional number is typed, the number is inserted at the cursor location between the bidirectional text run and the non-bidirectional text run. The cursor is then placed to the right of the inserted number. Subsequently-typed bidirectional numbers are inserted left to right.

Figure 5:
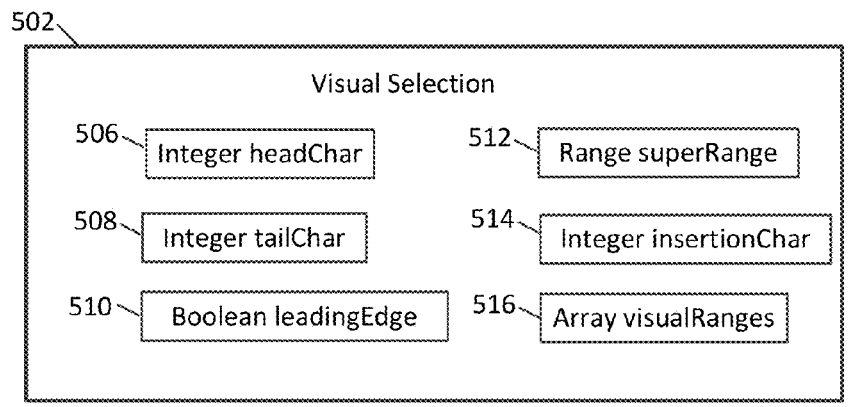
FIG. 5 is an illustrative drawing of a visual selection data structure in accordance with one or more embodiments.

FIG. 5 is an illustrative drawing of a visual selection data structure in accordance with one or more embodiments. A visual selection is created when, for example, a user selects a contiguous sequence of displayed characters. In another example, an application program can request that a selection of a sequence of displayed characters be generated. A visual selection is then generated and displayed in response to the application's request. Note that the term "visual" is used herein to indicate that an object can appear on a display, and to distinguish from "logical" characters and selections, that can be arranged in an order different from that of a corresponding visual selection. Other terms could be used instead, such as "displayable" and "internal", respectively. The terms "visual" and "logical" are used for explanatory purposes, and are not meant to imply that the described objects have visual or logical aspects not described herein.

The visual selection data structure 502 can represent a single instance of a visual selection. A visual selection is, for example, a range of visually consecutive characters or a cursor (i.e., a caret or insertion point). In the case of the cursor, the data structure 502 identifies a single character adjacent to the cursor, and a position of the cursor relative to the character. For example, the cursor can be at the leading or trailing edge of the character. In the case of a selection of a range of characters, the selected visual characters appear in a contiguous order on the display. The order of the characters on the display is actually generated for display purposes, e.g., when the characters are displayed, and is not necessarily the same as the order in which the characters are stored in backing store (i.e., memory, a storage medium, or the like). The order of the characters on the display can be a rearrangement of the backing store order into a display order. Bidirectional text can be displayed in an order opposite that which the text is stored in memory. The visual selection data structure can be used to map the visual selection to the backing store characters, e.g., to determine which characters have been selected. Conversely, the data structure can also be used to map a given set of backing store characters to a visual selection, e.g., by generating a visual selection data structure that corresponds to a specified set of backing store characters.

In one or more embodiments, the visual selection data structure 502 can represent either a selection of text or an insertion caret (i.e., cursor). To represent a selection, the data structure 502 includes a headChar 506 and a tailChar 508, which are the backing store indexes of the first and last characters of the visual selection, respectively. Note that although headChar and tailChar are the first and last characters of the selection, the characters in the backing store between the headChar and the tailChar are not necessarily the actual selected characters, since the order of characters in the backing store can differ from that of the visual selection. Each visual character has an index that identifies the location of the character in the backing store. The location of the character in the backing store is needed because the backing store is the actual representation of the text, and is used for operations such as insertion, deletion, cut, copy, paste, and so on. The actual locations of the selected characters in the backing store are determined using techniques described below, and are themselves stored in the visualRanges array 516, which is an array of ranges of characters in the backing store. In one aspect, each range in the visualRanges array 516 corresponds to a run of text in the visual selection.

As noted above, the data structure 502 can also represent a caret (i.e., cursor or insertion point). The data structure 502 includes a leadingEdge flag 510 that is used in combination with a position value (e.g., headChar) to represent a caret. The leadingEdge flag is true if the cursor is located at the leading edge of the character identified by the headChar 506, and false if the cursor is located at the trailing edge of the character identified by the headChar. The leadingEdge flag 510 is needed because a caret at a boundary between characters having different directions (i.e., language or text directions) can have one of three possible positions in the backing store, as described above with reference to FIG. 2A, and the headChar index that identifies a character at which the caret is positioned does not distinguish between these possible positions. The leadingEdge flag 510 is therefore used to distinguish between the three possible positions and determine where the caret is to be drawn (and the point at which text is to be selected, inserted, or deleted). Thus the actual position of the caret is specified by a character that touches the caret and a flag that indicates whether the caret is at the beginning of that character, i.e., the leading edge, or at the end of that character, i.e., the trailing edge. In this way, the caret is an absolute visual location. For example, referring to FIG. 2A, the caret 200 is located between the space at the end of the first run of English text and the Arabic number 1 that is visually adjacent. The caret could belong to the space character or to the Arabic number 1. In the case shown, the caret is on the trailing edge of the space, so the caret can be identified by a headChar value set to the index of the space character in the backing store, and a leadingEdge value of false.

The visual selection data structure 502 also includes a visualRanges array 516, which is an array of visual ranges. As described above, a visual selection is a selection in which the selection display is in the visual order of the characters, e.g., as the characters appear on a display screen. Once a visual selection is identified by a headChar and a tailChar, the visual selection is broken down into a sequence of logical ranges that are stored in the visualRanges array 516. Logical ranges are ranges of characters in the backing store, e.g., a starting position and an ending position, or a starting position and a length. A logical range can also be referred to as a logical selection. The visualRanges array of logical ranges can be used when, for example, text is cut, to identify the text to be cut.

In one or more embodiments, a user can cause a visual selection to be created by selecting one or more characters of text. The user can select text by, for example, clicking or touching a location in displayed text to specify one end of a selection, and dragging the other end of the selection across the desired text. A visual selection data structure 502 can be created by identifying the first and last characters in the selection. The first character can be the character that the user touched or clicked to begin selecting, and the last character can be the character that the user touched or selected to end selecting. The headChar and tailChar of the selection structure 502 are set to the first and last characters, respectively. The visualRanges array 516 can then be created as described above. On a touch screen the head and tail of the visual selection are not allowed to cross. For an LTR paragraph on a touch screen, the head is the top or leftmost character in the visual selection and the tail is the bottom or rightmost character. Similarly, for an RTL paragraph on a touch screen, the head is the top or rightmost character in the visual selection and the tail is the bottom or leftmost character. The selection is display, e.g., by highlighting the selected text, as the text is selected. For example, as each character is selected, the selection increases in size to cover all of the selected characters. All selected characters that are displayed contiguously, e.g., on the same line, are highlighted. For example, when text that contains both RTL and LTR text is selected, as shown in FIG. 1, item (3c), the head and tail of the selection remain at the beginning and end characters of the selection, and do not cross each other. That is, the incorrect behavior shown in item (3b) of FIG. 1, in which the selection is extended to the leftmost character of the Arabic text, even though the user has not selected that text, does not occur when a visual selection is used. The visual selection correctly highlights the selected characters because the visual selection is distinct from the logical selection as described elsewhere herein. In one or more embodiments, actions such as copy, cut, and paste can be performed on a visual selection. Further, a user can type or delete characters at the insertion point. To copy a visual selection, each contiguous run of selected text is copied and appended to the clipboard or other storage area A logical block of characters can also be selected and converted to a visual selection. This conversion can be useful when, for example, several contiguous characters belong to the same logical unit, such as a Uniform Resource Locator (URL), placeholder text, email subject, as so on, and some of the characters have different directions. Thus, selecting a URL results in a visual selection of the URL, even if the URL contains both Arabic and English characters. Conversion from a logical block of characters to a visual selection can be done using the processes shown in FIGS. 12A and 12B. Conversely, a visual selection can be done by forming a union of the visual selection ranges.

Figure 6A:
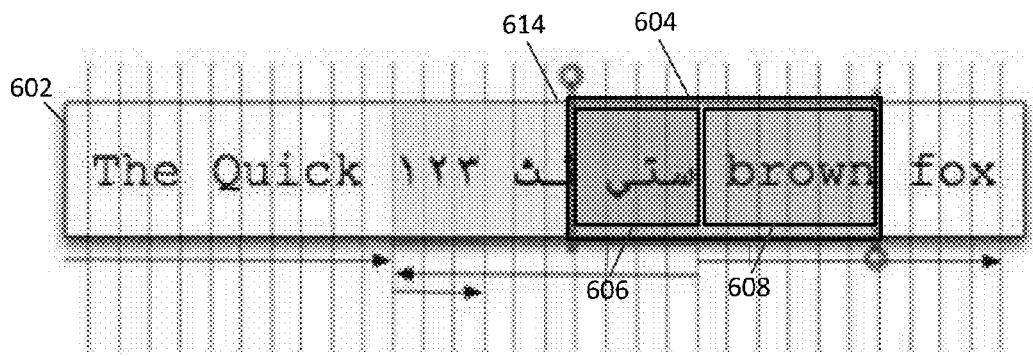
FIGS. 6A and 6B show a visual selection cut operation in accordance with one or more embodiments.
Figure 6B:
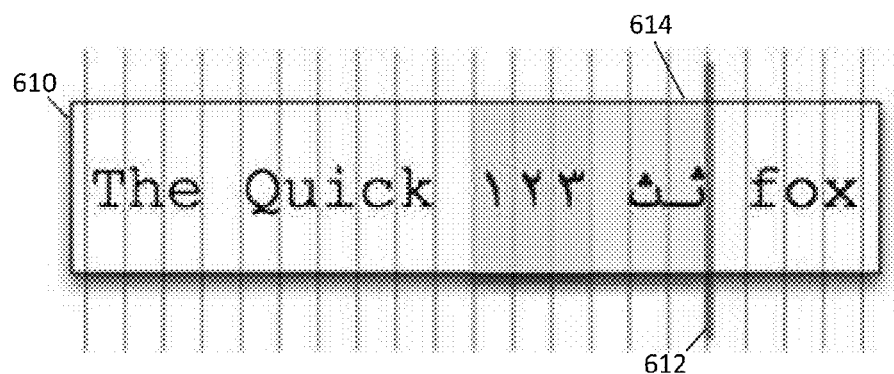

FIGS. 6A and 6B show a visual selection cut operation in accordance with one or more embodiments. As shown in FIG. 6A, to cut a visual selection from visual text 602, the selected text 604 is copied to the clipboard or other storage area, the runs 606, 608 of the selected text 604 are deleted from the text. As shown in FIG. 6B, in the remaining text 610, the insertion point 612 is set to the right edge of the character 614 and to the left of the deleted selection.

Figure 7:
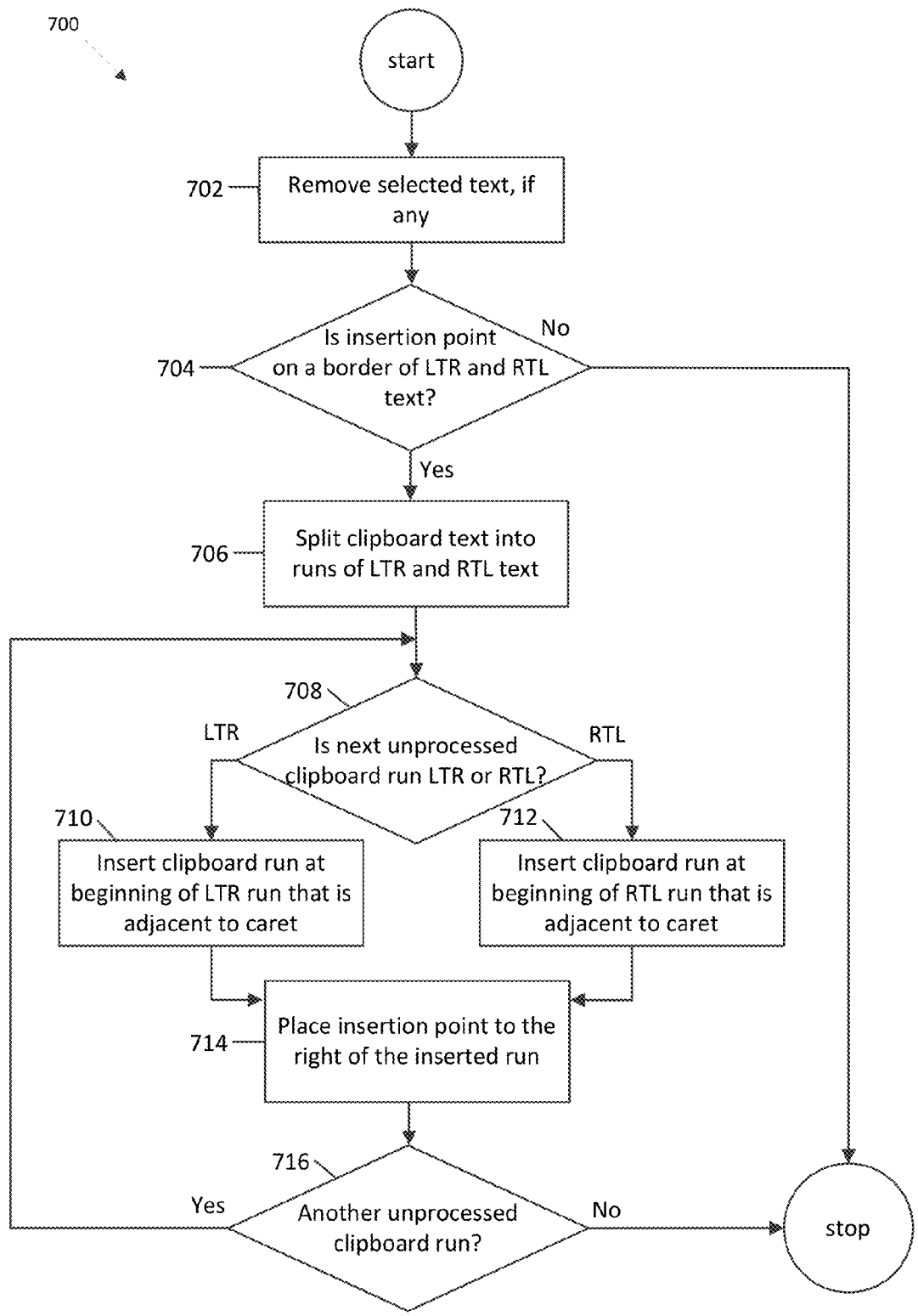
FIG. 7 is an illustrative flowchart of a visual paste process in accordance with one or more embodiments.

FIG. 7 is an illustrative flowchart of a visual paste process in accordance with one or more embodiments. Process 700, like the other processes described herein, can be implemented as, for example, computer program code encoded on a computer readable medium and executable by a processor of a computer system. The paste process 700 begins at block 702 by removing any selected text. Block 702 can be omitted if deletion of the selection as part of a paste operation is not desired. Block 704 determines whether the insertion point (i.e., caret) is on a border of right-to-left (RTL) and left-to-right (LTR) text. If not, the process ends, and the paste operation can be handled by another process that need not handle pasting of bidirectional text. Otherwise, if the insertion point is on a border of RTL and LTR text, block 706 splits the clipboard text into runs of RTL and LTR text. Block 708 begins a loop through the clipboard runs, determining whether the next unprocessed run (i.e., the next run in the runs generated by the split operation) is an RTL run or an LTR run. If the run is an LTR run, then block 710 inserts the run at the beginning of the LTR run that is adjacent to the caret in the destination text. Alternatively, if the run is an RTL run, then block 712 inserts the run at the beginning of the RTL run that is adjacent to the caret. In either case, block 714 then places the insertion point to the right of the inserted run. Block 716 determines if there is another unprocessed run in the clipboard text, and, if so, transfers control to block 708 to process the next unprocessed run. Once all the runs in the clipboard have been processed and inserted into the destination text, process 700 ends. The clipboard text has been inserted in an order that results in the clipboard text appearing in visual order.

Figure 8:
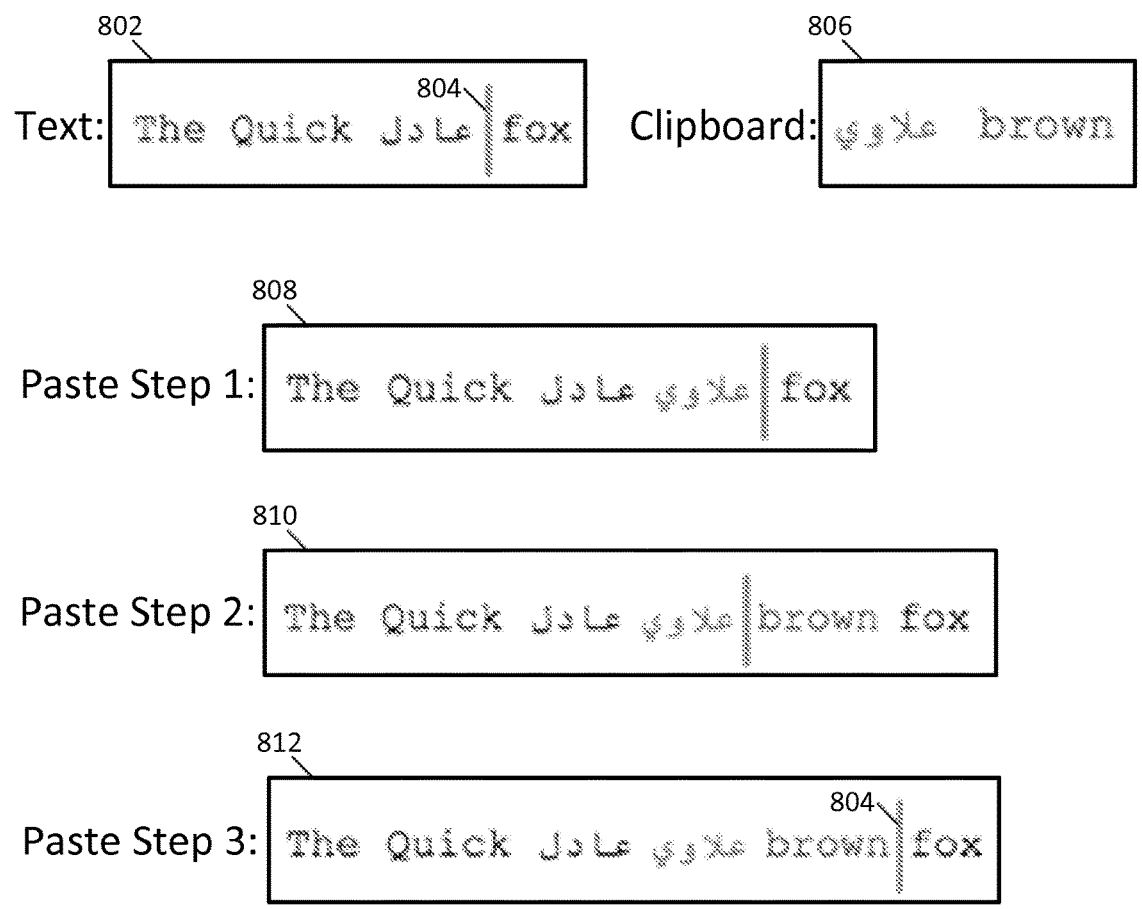
FIG. 8 shows a visual paste operation performed by a visual paste process in accordance with one or more embodiments.

FIG. 8 shows a visual paste operation performed by a visual paste process in accordance with one or more embodiments. A caret 804 has been positioned in text 802 at a location between the Arabic run and the second English run. The clipboard contains clipboard text 806 that includes an Arabic run and an English run. The paste operation begins by removing the selected text, if any, using the visual cut operation described above. There is no selected text to remove in the example of FIG. 8. Next, if the insertion point is on the border of a right-to-left (RTL) and left-to-right (LTR) run, the process splits the clipboard text to be pasted into runs of RTL and LTR directions. In FIG. 8, the insertion point 804 is at such a border, so the clipboard text 806 is split into RTL and LTR runs. The process then distributes the runs from the clipboard into the text, inserting RTL runs at the beginning of the RTL run that is adjacent to the insertion point, and inserting LTR runs at the beginning of the LTR run that is adjacent to the insertion point. As a result, the inserted runs form a contiguous run at the insertion point. Referring to the example in FIG. 7, the clipboard text 806 is split into two runs: an Arabic run and an English run ("brown"). The Arabic clipboard run is inserted at the beginning of the Arabic run in the destination text, and the insertion point is set to the right of the Arabic run, resulting in text 808. The English clipboard run is then inserted at the beginning of the English run in the destination text, resulting in text 810. The insertion point is then placed to the right of the pasted English text, resulting in the visual text 812 with the insertion point (i.e., caret) between the words "brown" and "fox", and the paste is complete.

FIGS. 9A-9F show a visual character insertion process for inserting a character in visual text in accordance with one or more embodiments. The process of FIG. 9A updates the visual representation of text to include a new character when, for example, a user presses a key to insert a character at the location of the caret. The user can position the caret at a desired location in the text by, for example, clicking a mouse button when a pointer is at the desired location, or touching a location in the text on a touch screen display. The process begins at block 902 when a user types a character at an insertion point. Block 904 determines whether the insertion point (i.e., caret) is on a border of right-to-left (RTL) and left-to-right (LTR) text. If not, the process ends, and the character insertion operation can be handled by another process that can, for example, insert the character into the backing store at the current caret position. Otherwise, if the insertion point is on a border of LTR and RTL text, block 906 determines whether the input character is LTR or RTL. If the input character is LTR, then block 908 inserts the character on the LTR side of the caret. Otherwise, if the input character is RTL, block 910 inserts the character on the RTL side of the caret. The process of FIG. 9A can be extended to handle numbers for RTL and LTR languages. For example, the digits within a number in an RTL language can be displayed in LTR order. To handle this case, a condition can be added between blocks 906 and 910 to determine if the character is part of a number, and, if so, to execute block 908 to insert the character in an LTR direction, so that the number will be displayed in LTR order.

Figure 9A:
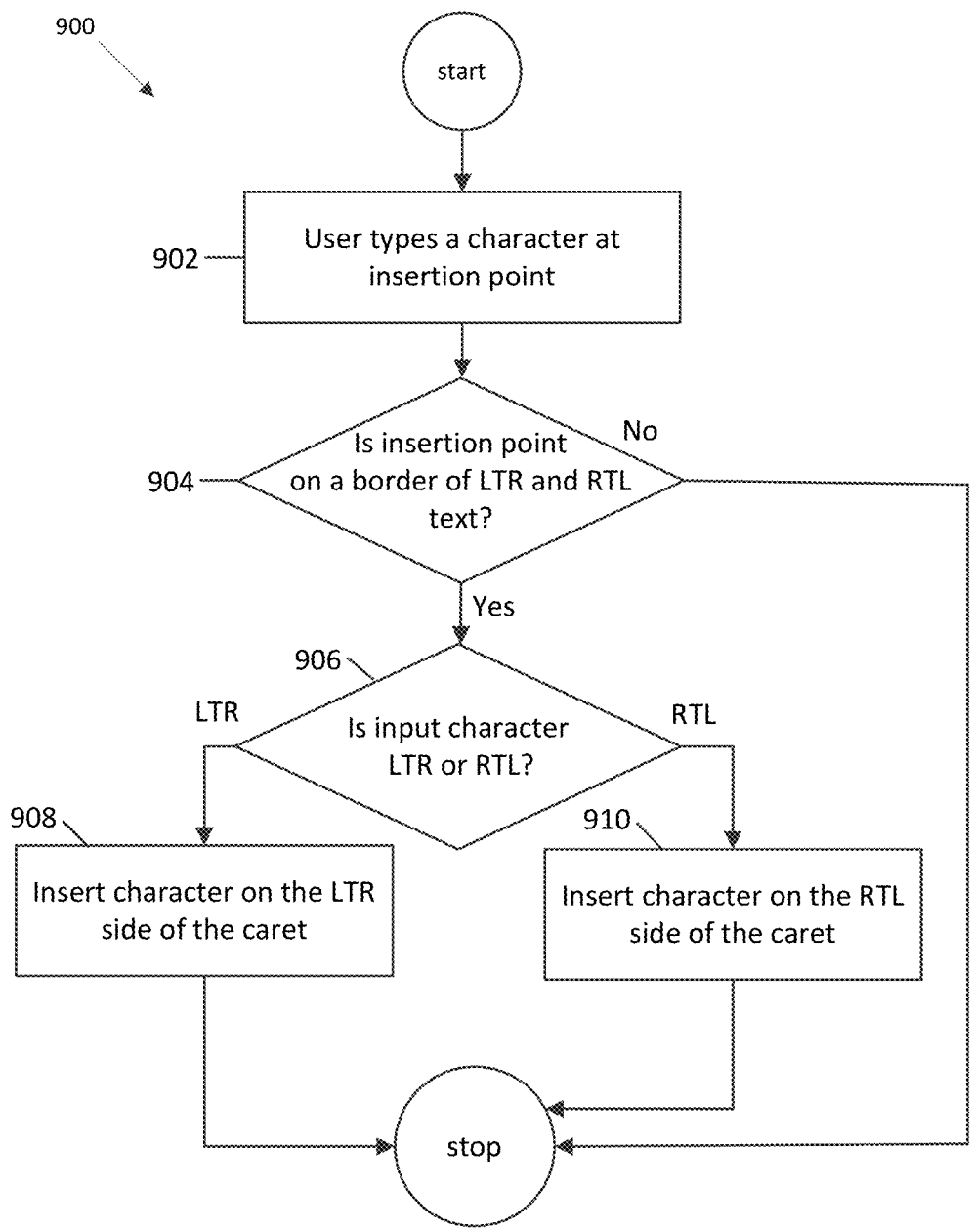
FIGS. 9A-9F show a visual character insertion process for inserting a character in visual text in accordance with one or more embodiments.
Figure 9B:
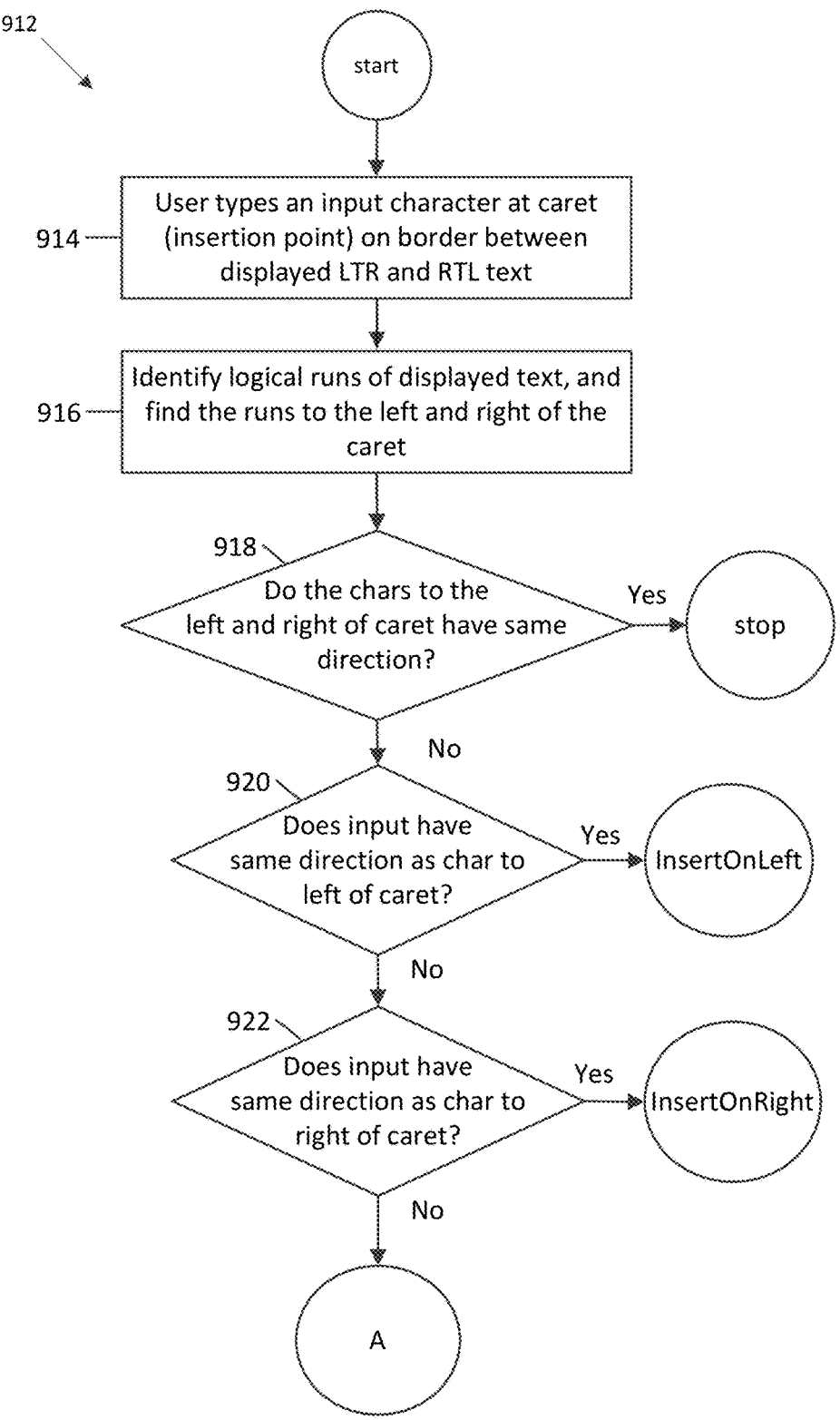
Figure 9C:
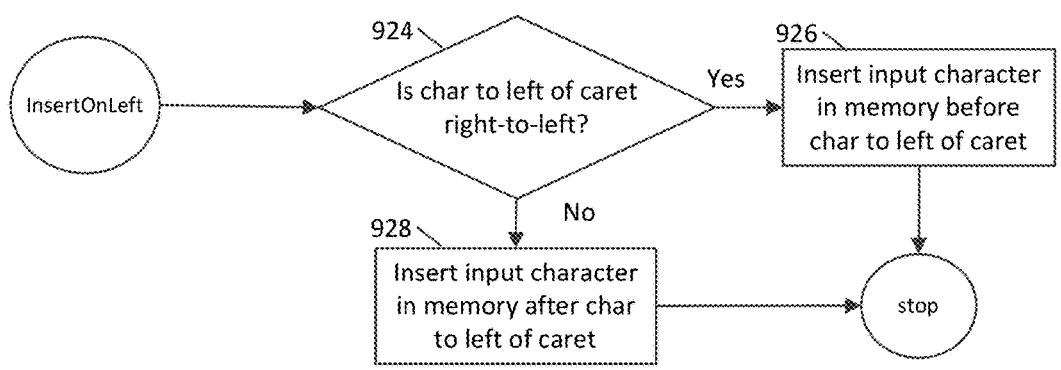
Figure 9D:
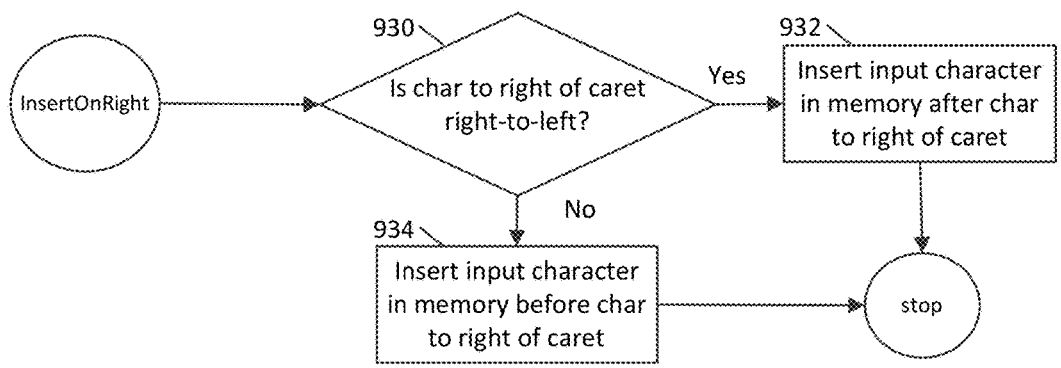

FIG. 9B shows a logical character insertion process 912 for inserting a character in a backing store, e.g., memory, in accordance with one or more embodiments. Thus, the logical insertion process 912 of FIG. 9B updates the logical representation of text to include a new character. The logical insertion process can be invoked when, for example, a user presses a key to insert a character at the location of the caret. The visual insertion process 900 of FIG. 9A and the logical insertion process 912 of FIG. 9B can both be invoked when a character is inserted. For example, the logical insertion process can be invoked by a user interface or by the visual insertion process. The logical insertion process 912 begins at block 914 when a user types an input character at the caret. Block 916 identifies logical runs of displayed text, and finds the run to the left of the caret and the run to the right of the caret.

Block 918 determines whether the characters to the left and right of the caret have the same direction. Note that the characters to the left and right of the caret are part of the corresponding runs, and can be determined from the runs. If block 918 determines that the characters to the left and right of the caret have the same direction, then the process ends, because there is no bidirectional text boundary at the caret, and the text can be inserted according to existing techniques, e.g. inserting the character at the location of the caret in the run. If block 918 determines that the left and right characters have different directions, then there is a boundary between two different directions of text, and the process continues to block 920. Block 920 determines whether the input (e.g., the typed character) has the same direction as the character to the left of the caret. If so, the input is inserted to the left of the caret by an InsertOnLeft process. The InsertOnLeft process, shown in FIG. 9C, determines whether the input is to be inserted on the left or right side of the character to the left of the caret. The InsertOnLeft process checks whether the character to the left of the caret is right-to-left (RTL) in direction at block 924, and, if so, block 926 inserts the input character in memory (e.g., in a backing store) before the character to the left of the caret. The term "before" can be understood as meaning "prior to" in the order of characters in the backing store. Otherwise, block 928 inserts the input character in memory after the character to the left of the caret. When a character is inserted, the process ends.

Returning to FIG. 9B, when the condition of block 920 is not true, block 922 determines whether the input has the same direction as the character to the right of the caret. If so, the input is inserted to the right of the caret by an InsertOnRight process. The InsertOnRight process, shown in FIG. 9D, determines whether the input is to be inserted on the left or right side of the character to the right of the caret. The InsertOnRight process checks, at block 930, whether the character to the right of the caret is right-to-left. If so, block 932 inserts the input character in memory after the character to the right of the caret. Otherwise, block 934 inserts the input character in memory before the character to the right of the caret.

Figure 9E:
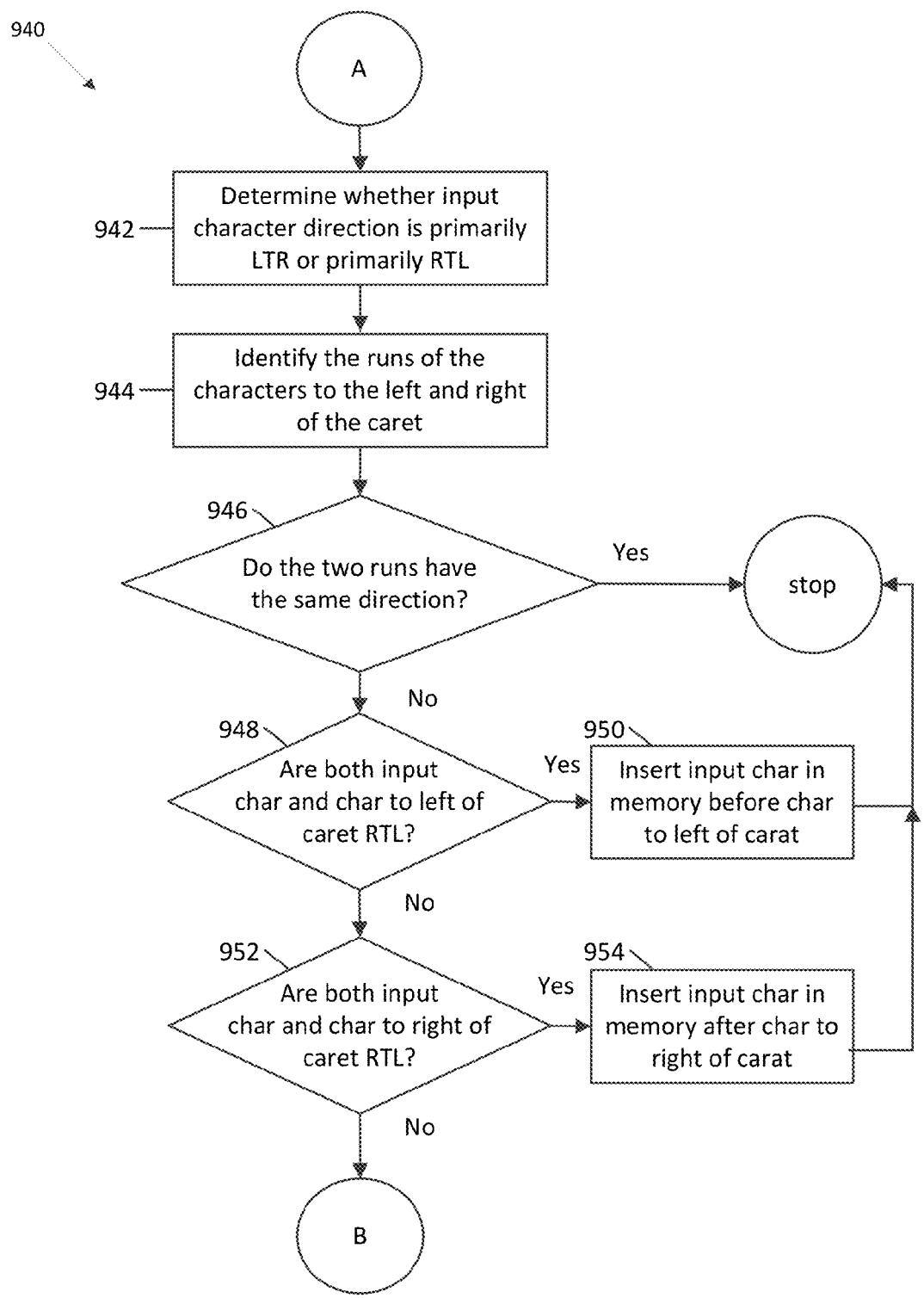

Returning again to FIG. 9B, when the condition of block 922 is not true, control transfers to point A of process 940 of FIG. 9E. Block 942 is then executed to determine whether the input character direction is primarily left-to-right or primarily right-to-left. This information can be obtained from the type of keyboard in use, and is used for the directions of the input character in the remaining blocks of the process. Block 944 identifies the runs of characters to the left and right of the caret. Block 946 determines whether the two runs have the same direction. If so, the process exits for the same reasons described above with reference to block 918. Block 948 determines whether both the input character and the character to the left of the caret are right-to-left in direction. If so, block 950 inserts the input character in memory before the character to the left of the caret. As an example, given the following starting visual order of characters (where A1 represents an Arabic character, E1 represents an English character, and | represents the caret):

A3 A2 A1|E1 E2 E3 and the input A*

After insertion the visual order is

A3 A2 A1 A*|E1 E2 E3

Hence, the storage order of the above right-to-left run is now (A*,A1,A2,A3), so the A* is inserted "before" A1.

If the condition of block 948 is not true, then block 952 determines whether both the input character and the character to the right of the caret are right-to-left in direction. If so, block 954 inserts the input character in memory after the character to the right of the caret. For example, given the following starting visual order of characters:

E1 E2 E3|A3 A2 A1 and the input A*

After insertion the visual order is:

E1 E2 E3|A*A3 A2 A1

Hence, the storage order of the above right-to-left run is now (A1,A2,A3,A*), so the A* is inserted "after" A3.

Figure 9F:
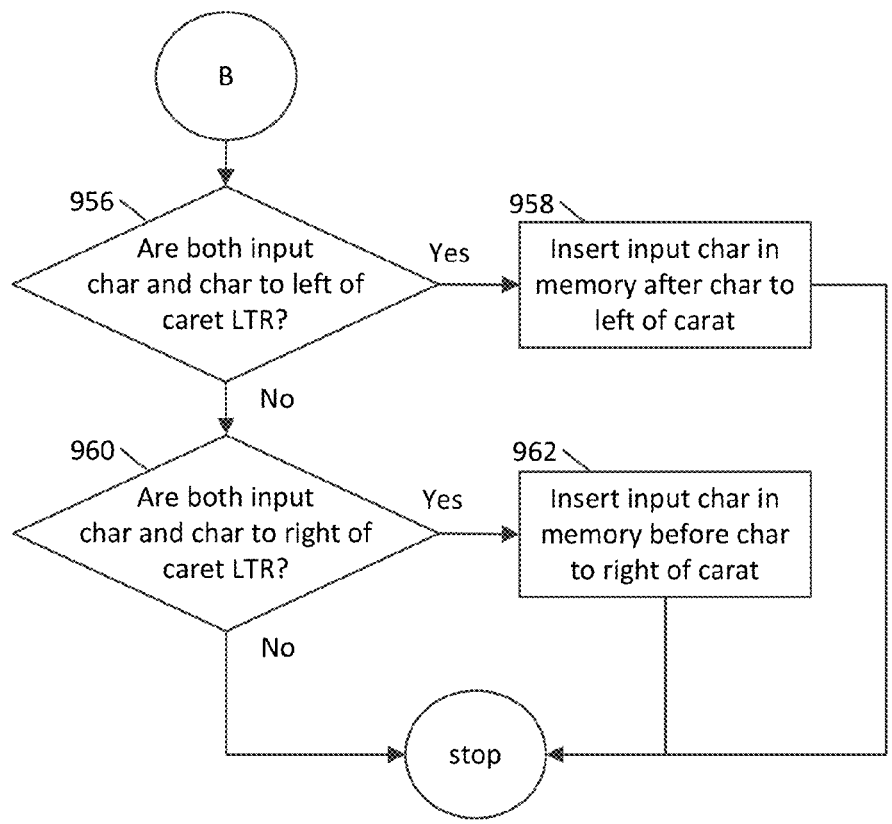

If the condition of block 952 is not true, then control transfers through point B to the process of FIG. 9F, in which block 956 determines whether both the input character and the character to the left of the caret are left-to-right in direction. If so, block 958 inserts the input character in memory after the character to the left of the caret. As an example, given the following starting visual order of characters:

E1 E2 E3|A3 A2 A1 and the input E*

After insertion the visual order is:

E1 E2 E3 E*|A3 A2 A1

Hence, the storage order of the above left-to-right run is now (E1,E2,E3,E*), so the E* is inserted "after" E3.

If the condition of block 956 is not true, then block 960 determines whether both the input character and the character to the right of the caret are left-to-right in direction. If so, block 962 inserts the input character in memory before the character to the right of the caret. As an example, given the starting visual order of characters:

A3 A2 A1|E1 E2 E3 and the input E*

After insertion the visual order is:

A3 A2 A1|E*E1 E2 E3

Hence, the storage order of the above left-to-right run is now (E*,E1,E2,E3), so the E* is inserted "before" E1. The insertion process ends after block 962. Further, if block 960 is reached, the condition is expected to be true, so the No branch from block 960 is not expected to be executed. In the examples described above, the direction of the characters can be either LTR or RTL. In another example, a character "class" is used instead of a left or right direction attribute. The class is used to represent the possible directions, e.g., strong left, strong right, numeric, and so on. If the two characters adjacent to the caret have the same class, they match.

Figure 10:
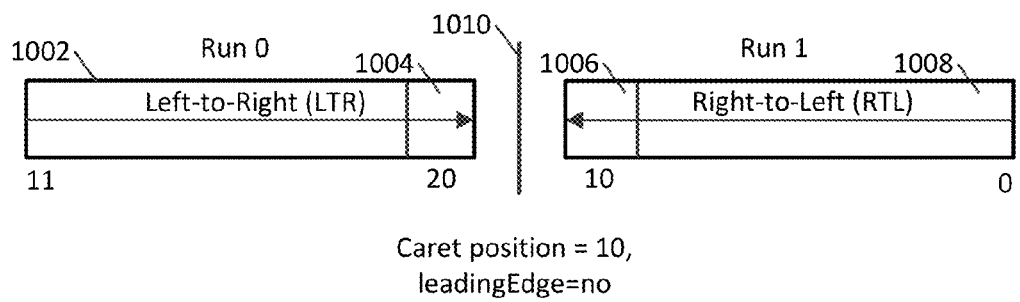
FIG. 10 is an illustrative drawing of an example scenario in which a character is inserted into a backing store in accordance with one or more embodiments.

FIG. 10 is an illustrative drawing of an example scenario in which a character is inserted into a backing store in accordance with one or more embodiments. FIG. 10 shows an example execution of the character insertion process of FIG. 9B, which determines the location in the backing store at which a character is to be stored when, for example, a user types a key corresponding to the character. FIG. 10 shows two runs of text, Run0 1002 and Run1 1008, of different directions. The two runs can be elements of an array of runs that form a block of text on a screen. The two runs are separated by a caret 1010, which can be understood as a visual representation of an insertion point. In this example, a user has placed the caret between the two runs, e.g., by clicking a mouse pointer or touching a location on the touch screen. The insertion process determines the location of the visual caret 1010 in the visual text, and identifies the two runs 1002, 1008 adjacent to the caret 1010. Run0 is a left-to-right (LTR) run, and includes a rightmost visual character 1004. Run1 is a right-to-left (RTL) run, and includes a leftmost visual character 1006. Note that a run can include one or more characters, and if a run includes more than one character, the characters in the run all have the same direction. The individual characters 1004, 1006 adjacent to the caret 1010 are used to determine how a new character is to be inserted at the location represented by the caret 1010. The array of runs is numbered from left to right, so the left run is labeled Run0, and the right run is labeled Run1. Run0 includes characters having backing store indexes 11-20, and Run1 includes characters having backing store indexes 0-10.

The insertion process traverses the runs in visual order (e.g., left to right). In this example, the caret is associated with the character 1006 of Run1 having index 10, and the leadingEdge flag property of the caret is false. That is, the caret is attached to the character at index 10, and is on the trailing edge of that character. The insertion process uses the leading edge flag and the location of the caret to determine the backing store location at which the new character is to be inserted. For each run, the process determines whether the caret is in that run. In this example, the caret is not in Run0, because the character position of the caret, 10, is not in the range of Run0 (11-20). The insertion process checks the next run, Run1 in this example, and finds that the caret position is in Run1, because the caret's position, 10, is within the range of Run1 (0-10).

The insertion process loops across runs to find the caret, selecting the runs in left to right traversal regardless of the direction of the text. Next, the process loops across characters in the identified run in visual order, which is left-to-right by convention. Thus, the process loops through the characters, moving backwards through the backing store for right-to-left text, to find the character associated with the caret. There is a visual array, ordered left to right, which corresponds to the characters being displayed, and can be scanned to find the carat character. Once the caret character is found, the leadingEdge flag is consulted to determine the actual location of the caret. In this example, the caret character is at storage index 10, and the caret's leadingEdge flag is false, so the caret is at the tailing edge of character 10. Character 10 is a right-to-left character, since it is part of a right-to-left run. Since character 10 is on the right side of the caret, the other character adjacent to the caret is the character to the visual left of the caret. Thus, the other character adjacent to the caret is character 1004 at storage index 20. Since the left-to-right character 1004 is to the left of the caret 1010, the caret 1010 is at the trailing edge of the left-to-right character 1004. The index of the character associated with the caret, the direction of that character, and the leadingEdge flag of that character are used to determine the next visual character. In this example, the next visual character is the character to the visual left of character 10, which is character 20. This information corresponds to a caret information structure. The caret is at storage location 10 with leadingEdge=no. The character to the right of the caret, i.e., rightChar, is at location 10, and the character to the left of the caret, i.e., leftChar, is at location 20. The direction of the character to the right (i.e., rightDir) is right-to-left (RTL), and the direction of the character to the left (leftDir) is left-to-right (LTR).

Thus, the character to the right of the caret has an index of 10, the character to the left of the caret has an index of 20, and the directions of the two characters (RTL and LTR) do not match. When the directions do not match, additional logic is used to determine where to place the character, as described below.

For example, suppose the user types a letter A. The letter A is known to be a left-to-right (LTR) character (e.g., from Unicode information). Since A is a left-to-right character, it will go with the left-to-right run. Because the caret is on the trailing edge, A goes after the character 1004 of the left-to-right run. Therefore, A is inserted at the location of the character 1004 of the left-to-right run. Since the character 1004 is at storage location 20, the A is inserted at location 20+1, and extends the left-to-right run Run0. The carat's position then becomes 21. The carat changes from being a visual one to a logical one in response to the user typing a character. The logical carat's position matches the backing store. The character has now been inserted into the backing store, and the process exits.

Figure 11:
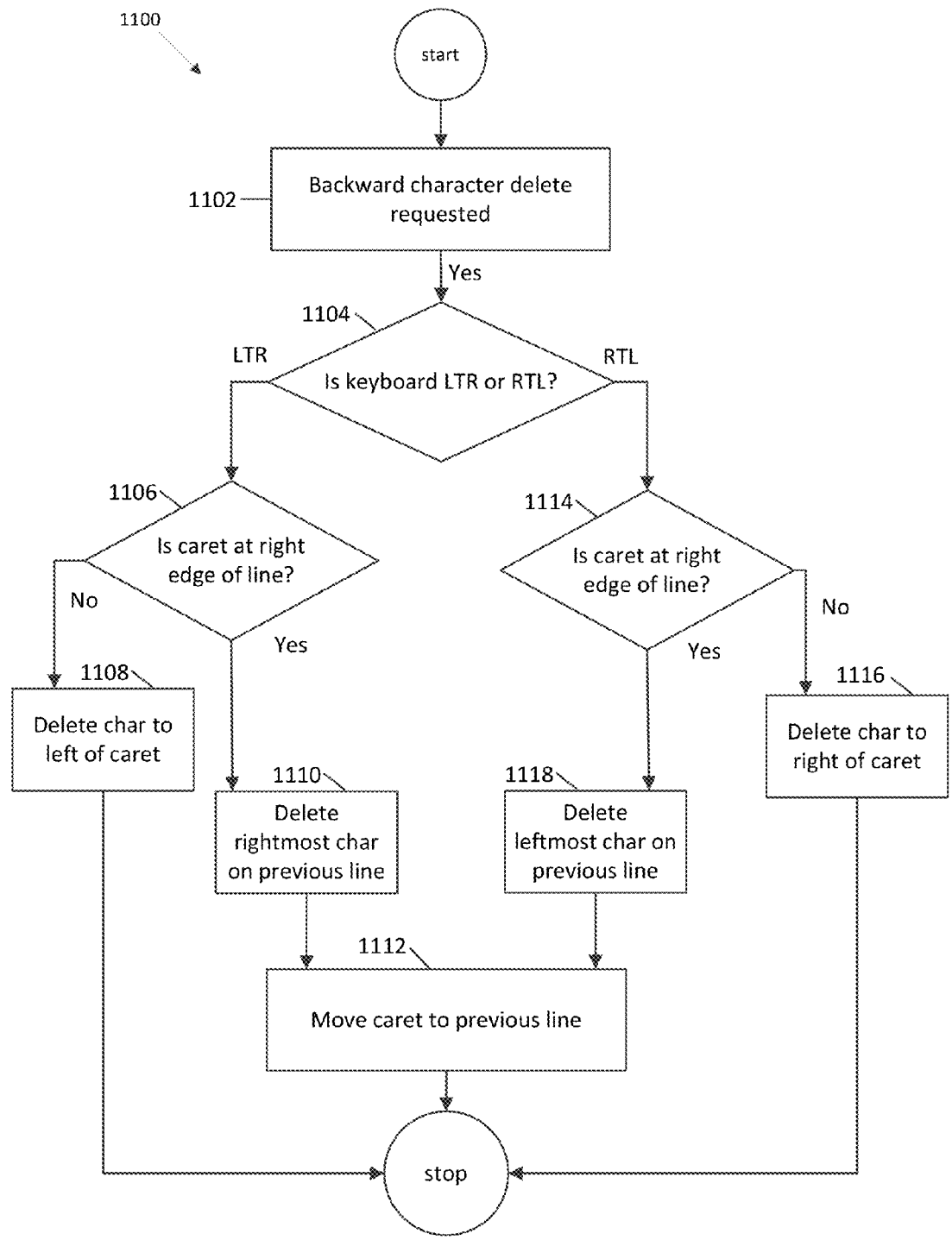
FIG. 11 shows a visual character deletion process in accordance with one or more embodiments.

FIG. 11 shows a visual character deletion process 1100 in accordance with one or more embodiments. The process of FIG. 11 can be invoked when, for example, a user presses a backward delete key to delete a character a backward direction. Block 1102 is executed when a user presses a backwards delete key, or a backwards delete operation is otherwise requested. Block 1104 determines whether the currently selected keyboard is for an LTR or an RTL language. If the keyboard is for an LTR (left-to-right) language, then block 1106 determines whether the caret is at the right edge of the line of text. If not, block 1108 deletes the character to the left of the caret and the process ends. Otherwise, if the caret is at the right edge of the line, then block 1110 deletes the rightmost character on the previous line, block 1112 moves the caret to the previous line, and the process ends. If, on the other hand, block 1104 determines that the keyboard is RTL (right-to-left), then block 1114 determines whether the caret is at the right edge of the line. If not, block 1116 deletes the character to the right of the caret, and the process ends. Otherwise, if the caret is at the right edge of the line, block 1118 deletes the left-most character on the previous line, block 1112 moves the caret to the previous line, and the process ends. The character has now been inserted into the backing store, and the process exits. Deletion in a forward direction, e.g., when a forward delete key is pressed, can be handled using similar a similar process, with the directions of the operations reversed.

Figure 12A:
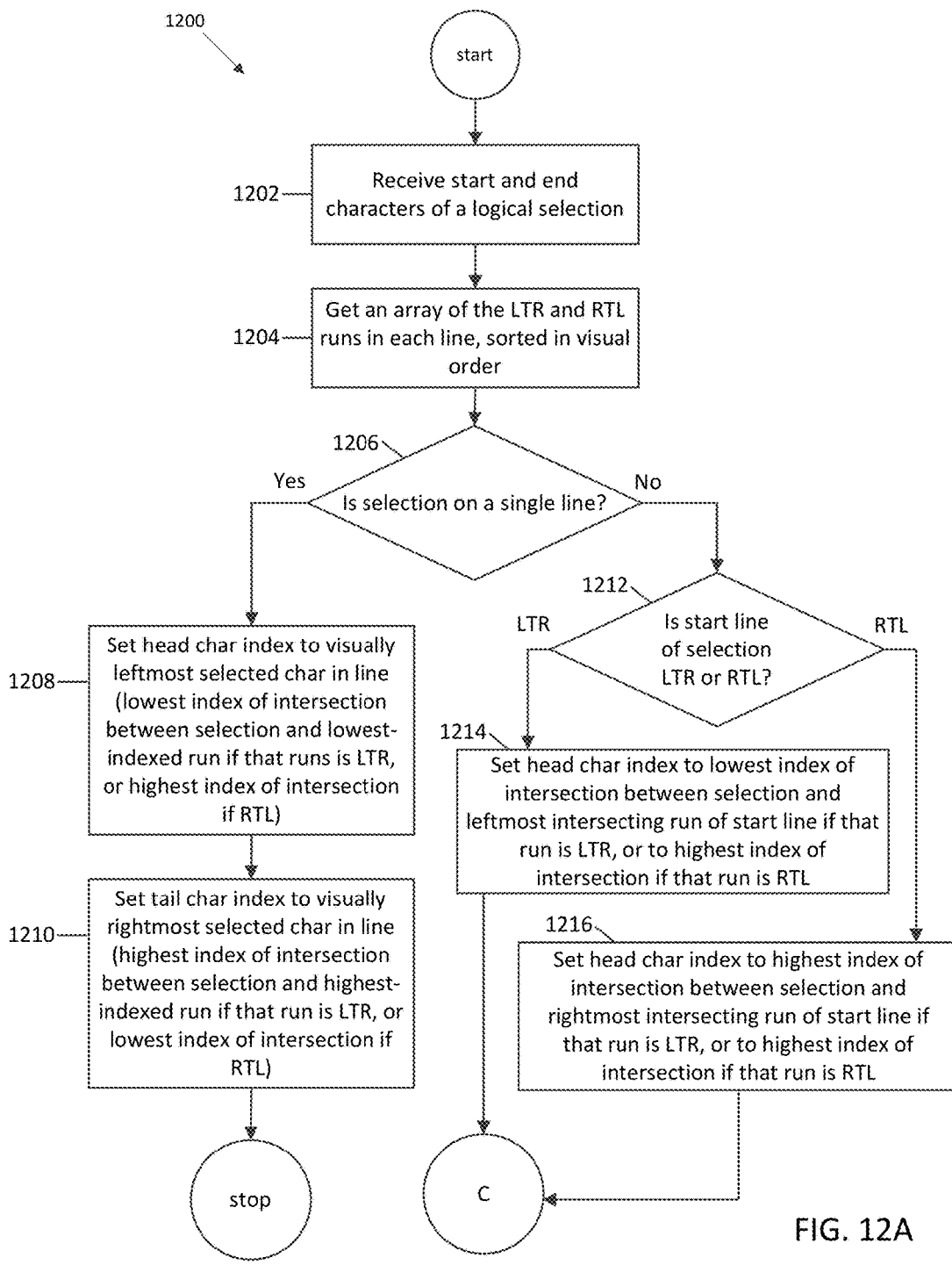
FIGS. 12A and 12B show a process for converting from a logical selection to a visual selection in accordance with one or more embodiments.
Figure 12B:
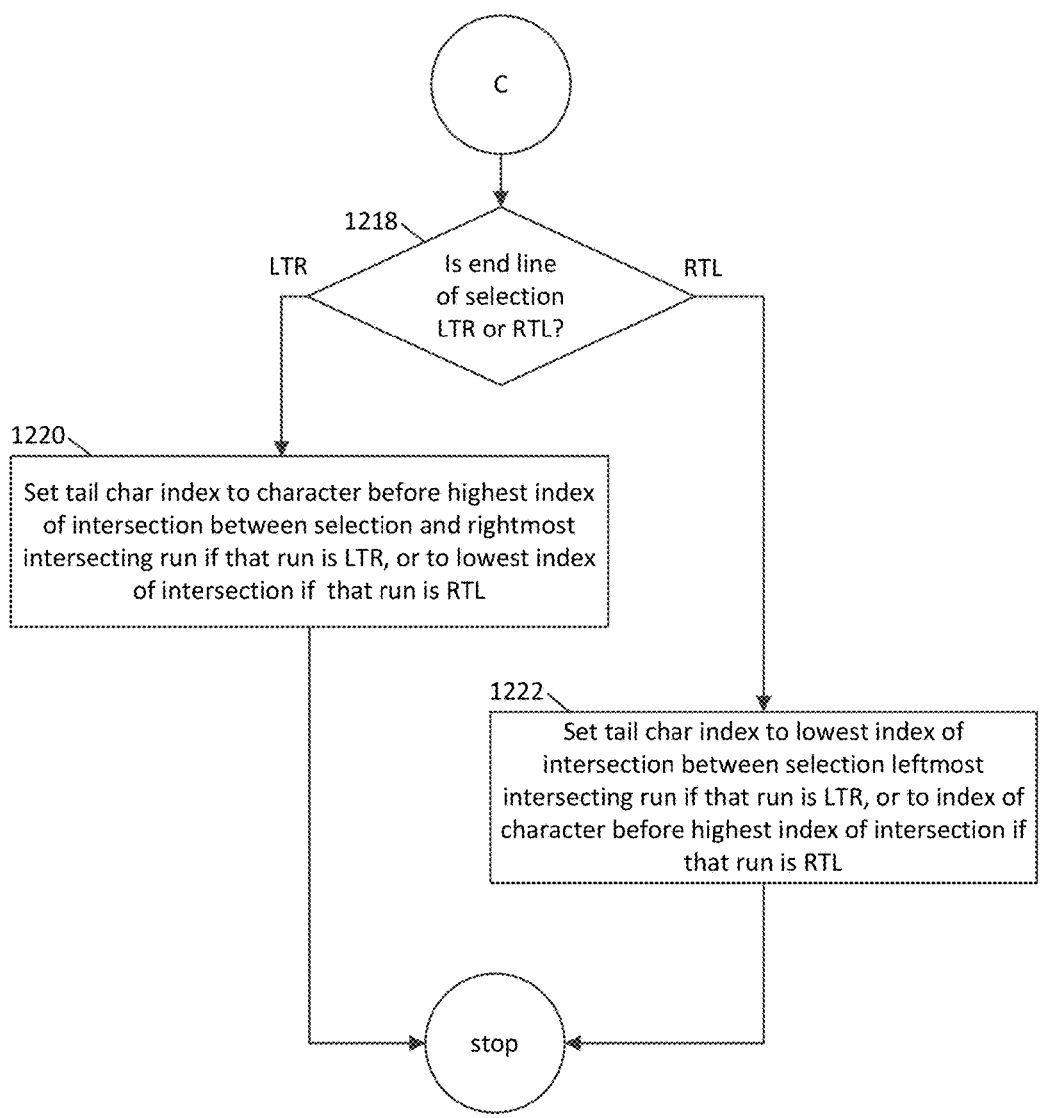

FIGS. 12A and 12B show a process 1200 for converting a logical selection to a visual selection in accordance with one or more embodiments. Block 1202 of the process of FIG. 12A receives a logical selection, which is represented as a range of characters in the backing store having a start index and an end index. Block 1204 generates an array of the runs (both left-to-right and right-to-left) in each line of the logical selection in visual order. Note that visual order is ordinarily left-to-right regardless of the direction of the text. Block 1206 determines whether the selection is on a single line. If so, block 1208 sets the head character index of the visual selection to the visually leftmost selected character in the line. That is, block 1208 sets the head character index to the lowest index of intersection between the selection and the lowest-indexed run of text on the line if that run is left-to-right. If that run is right-to-left, block 1208 sets the head character to the highest index of intersection between the selection and the lowest-indexed run of text on the line. The process then ends after block 1210. Otherwise, if block 1206 determines that the selection crosses multiple lines, then block 1212 determines whether the start line of the selection is left-to-right or right-to-left. If the line is left-to-right, block 1214 sets the head character index to the lowest index of intersection between the selection and the leftmost intersecting run of the start line if that run is left-to-right, or to the highest index of intersection if that run is right-to-left. Otherwise, if the line is right-to-left, block 1216 sets the head character index to the highest index of intersection between the selection and the rightmost intersecting run of the start line if that run is left-to-right, or to the highest index of intersection if that run is right-to-left.

The process continues from FIG. 12A to FIG. 12B at block 1218 by determining whether the end line of the selection is left-to-right or right-to-left. If the end line is left-to-right, block 1220 sets the tail character index to the character before the highest index of intersection between the selection and rightmost intersecting run if the rightmost intersecting run is left-to-right, or to the lowest index of that intersection if the rightmost intersecting run is right-to-left. Otherwise, if block 1218 determines that the end line of the selection is right-to-left, block 1222 sets the tail character index for the visual selection to the lowest index of intersection between the selection and the leftmost intersecting run, if that run is left-to-right. If that run is right-to-left, then block 1222 sets the tail character index to the index of the character before the highest index of intersection.

Figure 13:
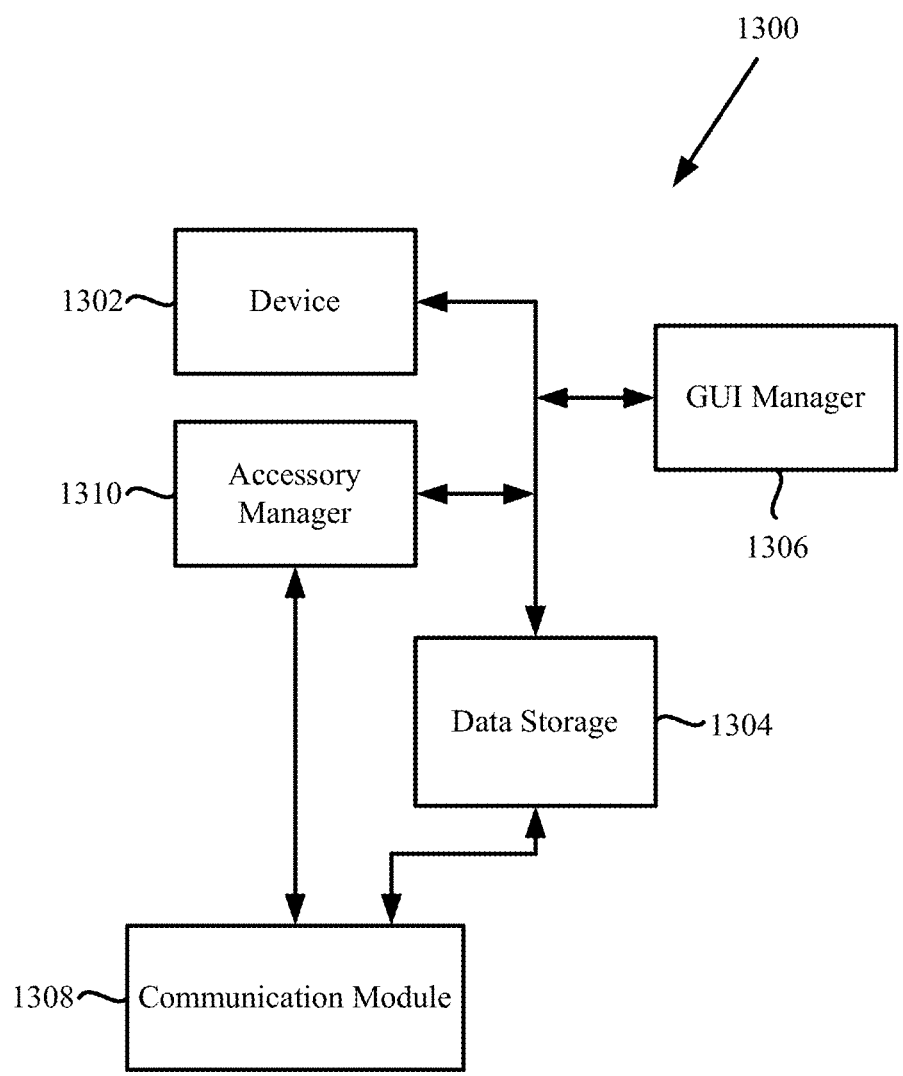
FIG. 13 is a block diagram of an arrangement of functional modules utilized by an electronic device.

FIG. 13 is a block diagram of an arrangement 1300 of functional modules utilized by an electronic device. The electronic device can, for example, be tablet device. The arrangement 1300 includes an electronic device 1302 that is able to output media for a user of the portable media device but also store and retrieve data with respect to data storage 1304. The arrangement 1300 also includes a graphical user interface (GUI) manager 1306. The GUI manager 1306 operates to control information being provided to and displayed on a display device. The arrangement 1300 also includes a communication module 1308 that facilitates communication between the portable media device and an accessory device. Still further, the arrangement 1300 includes an accessory manager 1310 that operates to authenticate and acquire data from an accessory device that can be coupled to the portable media device.

Figure 14:
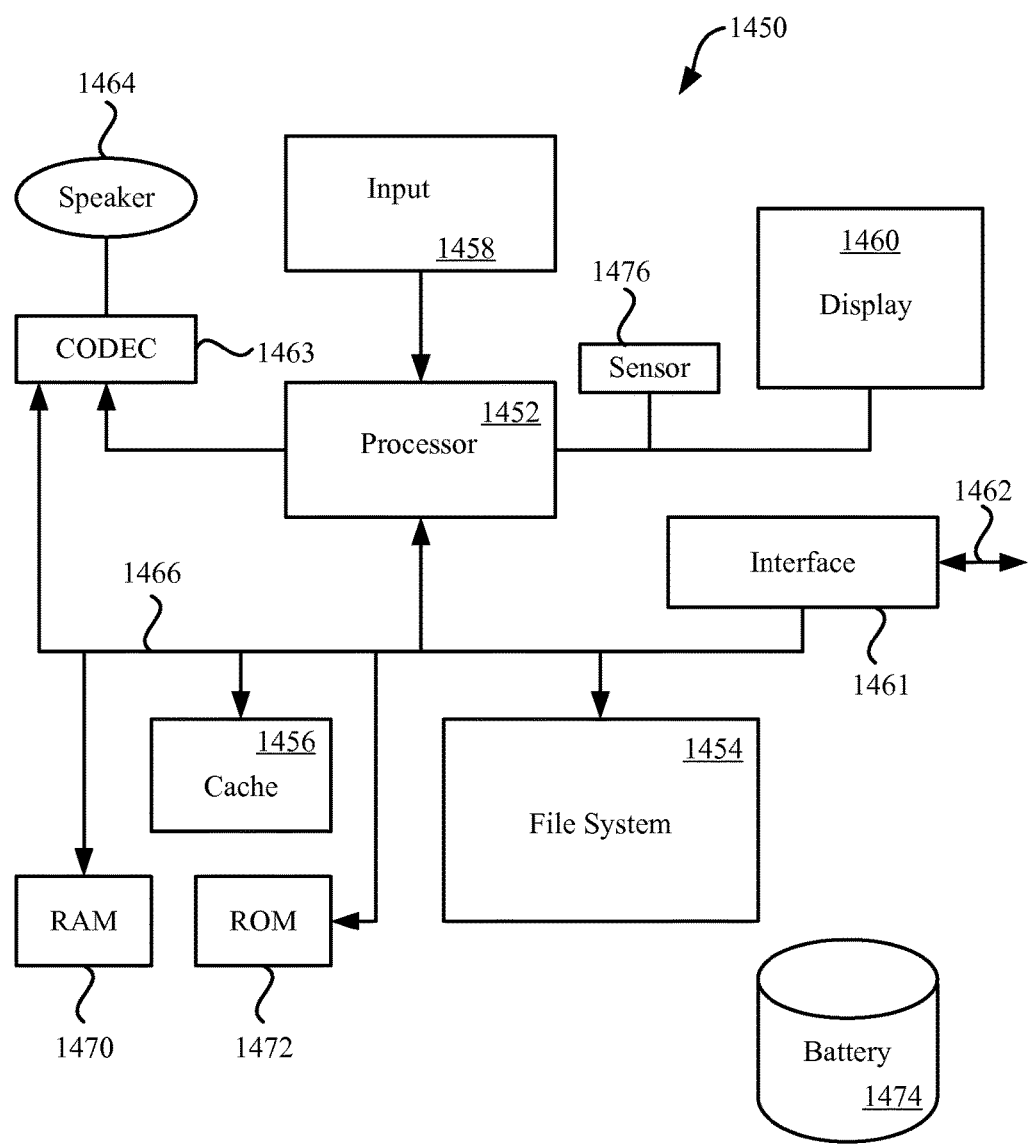
FIG. 14 is a block diagram of an electronic device suitable for use with the described embodiments.

FIG. 14 is a block diagram of an electronic device 1450 suitable for use with the described embodiments. The electronic device 1450 illustrates circuitry of a representative computing device. The electronic device 1450 includes a processor 1452 that pertains to a microprocessor or controller for controlling the overall operation of the electronic device 1450. The electronic device 1450 stores media data pertaining to media items in a file system 1454 and a cache 1456. The file system 1454 is, typically, a storage disk or a plurality of disks. The file system 1454 typically provides high capacity storage capability for the electronic device 1450. However, since the access time to the file system 1454 is relatively slow, the electronic device 1450 can also include a cache 1456. The cache 1456 is, for example, Random-Access Memory (RAM) provided by semiconductor memory. The relative access time to the cache 1456 is substantially shorter than for the file system 1454. However, the cache 1456 does not have the large storage capacity of the file system 1454. Further, the file system 1454, when active, consumes more power than does the cache 1456. The power consumption is often a concern when the electronic device 1450 is a portable media device that is powered by a battery 1474. The electronic device 1450 can also include a RAM 1470 and a Read-Only Memory (ROM) 1472. The ROM 1472 can store programs, utilities or processes to be executed in a non-volatile manner. The RAM 1470 provides volatile data storage, such as for the cache 1456.

The electronic device 1450 also includes a user input device 1458 that allows a user of the electronic device 1450 to interact with the electronic device 1450. For example, the user input device 1458 can take a variety of forms, such as a button, keypad, dial, touch screen, audio input interface, visual/image capture input interface, input in the form of sensor data, etc. Still further, the electronic device 1450 includes a display 1460 (screen display) that can be controlled by the processor 1452 to display information to the user. A data bus 1466 can facilitate data transfer between at least the file system 1454, the cache 1456, the processor 1452, and the CODEC 1463.

In one embodiment, the electronic device 1450 serves to store a plurality of media items (e.g., songs, podcasts, etc.) in the file system 1454. When a user desires to have the electronic device play a particular media item, a list of available media items is displayed on the display 1460. Then, using the user input device 1458, a user can select one of the available media items. The processor 1452, upon receiving a selection of a particular media item, supplies the media data (e.g., audio file) for the particular media item to a coder/decoder (CODEC) 1463. The CODEC 1463 then produces analog output signals for a speaker 1464. The speaker 1464 can be a speaker internal to the electronic device 1450 or external to the electronic device 1450. For example, headphones or earphones that connect to the electronic device 1450 would be considered an external speaker.

The electronic device 1450 also includes a network/bus interface 1461 that couples to a data link 1462. The data link 1462 allows the electronic device 1450 to couple to a host computer or to accessory devices. The data link 1462 can be provided over a wired connection or a wireless connection. In the case of a wireless connection, the network/bus interface 1461 can include a wireless transceiver. The media items (media assets) can pertain to one or more different types of media content. In one embodiment, the media items are audio tracks (e.g., songs, audio books, and podcasts). In another embodiment, the media items are images (e.g., photos). However, in other embodiments, the media items can be any combination of audio, graphical or visual content. Sensor 1476 can take the form of circuitry for detecting any number of stimuli. For example, sensor 1476 can include a Hall Effect sensor responsive to external magnetic field, an audio sensor, a light sensor such as a photometer, and so on.

The various aspects, embodiments, implementations or features of the described embodiments can be used separately or in any combination. Various aspects of the described embodiments can be implemented by software, hardware or a combination of hardware and software. The described embodiments can also be embodied as computer readable code on a non-transitory computer readable medium. The computer readable medium is defined as any data storage device that can store data which can thereafter be read by a computer system. Examples of the computer readable medium include read-only memory, random-access memory, CD-ROMs, DVDs, magnetic tape, and optical data storage devices. The computer readable medium can also be distributed over network-coupled computer systems so that the computer readable code is stored and executed in a distributed fashion.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of the specific embodiments described herein are presented for purposes of illustration and description. They are not target to be exhaustive or to limit the embodiments to the precise forms disclosed. It will be apparent to one of ordinary skill in the art that many modifications and variations are possible in view of the above teachings.

The advantages of the embodiments described are numerous. Different aspects, embodiments or implementations can yield one or more of the following advantages. Many features and advantages of the present embodiments are apparent from the written description and, thus, it is intended by the appended claims to cover all such features and advantages of the invention. Further, since numerous modifications and changes will readily occur to those skilled in the art, the embodiments should not be limited to the exact construction and operation as illustrated and described. Hence, all suitable modifications and equivalents can be resorted to as falling within the scope of the invention.

Although the foregoing invention has been described in detail by way of illustration and example for purposes of clarity and understanding, it will be recognized that the above described invention may be embodied in numerous other specific variations and embodiments without departing from the spirit or essential characteristics of the invention. Certain changes and modifications may be practiced, and it is understood that the invention is not to be limited by the foregoing details, but rather is to be defined by the scope of the appended claims.

What is claimed is:

1. A method for inserting a received character in bidirectional text, the method comprising:
    receiving an input corresponding to a visual insertion location for the received character within the bidirectional text, wherein the visual insertion location is positioned between adjacent characters of the bidirectional text having opposite text directions;
    mapping a position of each of the adjacent characters into a different index of a data object;
    identifying a plurality of prospective logical insertion locations for the received character according to the visual insertion location;
    determining an actual logical insertion location within the data object from the plurality of prospective logical insertion locations based on: the position of each of the adjacent characters,
        a text direction of the received character, and
        a text direction associated with each of the adjacent characters; and
    inserting the received character into the actual logical insertion location.

2. The method of claim 1, wherein determining the actual logical insertion location is further based on a type of the received character.

3. The method of claim 2, wherein the type of the received character corresponds to at least one of a letter, a number, a symbol, a word, a phrase, or a sentence.

4. The method of claim 1, wherein the adjacent characters of the bidirectional text include a left character and a right character.

5. The method of claim 4, wherein inserting the received character into the actual logical insertion location comprises:
   determining that the received character and the right character are both associated with a left-to-right (LTR) direction; and
   inserting the received character at the actual logical insertion location after the right character.

6. The method of claim 4, wherein inserting the received character into the actual logical insertion location comprises:
   determining that the received character and the left character are both associated with a right-to-left (RTL) direction; and
   inserting the received character at the actual logical insertion location before the left character.

7. The method of claim 1, further comprising:
   displaying the received character at the visual insertion location.

8. The method of claim 1, further comprising:
   receiving a selection of a plurality of characters within the bidirectional text, the selection including a combination of a first run of left-to-right (LTR) characters and a second run of right-to-left (RTL) characters;
   identifying a head character and a tail character in the selection;
   mapping a logical order of each character of the plurality of characters based on the identified head and tail characters, wherein the character is mapped to a unique location; and
   displaying a visual order of the plurality of characters, wherein the plurality of characters are automatically highlighted and wherein the plurality of characters that are highlighted correspond to the plurality of characters that were selected.

9. The method of claim 8, wherein the identified head and tail characters correspond to the first and last characters that were selected.

10. A method for pasting a plurality of characters associated with a left-to-right (LTR) run and a right-to-left (RTL) run into a string of bidirectional text, the method comprising:
    receiving a request to insert the plurality of characters into an insertion location in the string of bidirectional text, wherein the insertion location is positioned between adjacent characters separated by a boundary;
    mapping a position of each of the adjacent characters into a different index of a data object to identify a right adjacent character associated with a LTR run and a left adjacent character associated with a RTL run;
    establishing a first group of the plurality of characters associated with the LTR run and a second group of the plurality of characters associated with the RTL run; and
    inserting into the data object the first group prior to the right adjacent character and the second group after the left adjacent character, wherein the first group and the second group are displayed as a single continuous block of characters.

11. The method of claim 10, wherein the plurality of characters that are inserted into the insertion location include a combination of at least one of a letter, a symbol, a number, a word, a phrase, or a sentence.

12. The method of claim 10, wherein the first group and the second group that are inserted into the insertion location are automatically highlighted.

13. A method for displaying a selection of bidirectional text on a display of a computing device, the method comprising:
    receiving a selection of a plurality of characters within the bidirectional text, the selection having a combination of a first run of left-to-right (LTR) characters and a second run of right-to-left (RTL) characters that are separated by a boundary;
    identifying a head character and a tail character in the selection;
    mapping a logical order of each character of the plurality of characters based on the identified head and tail characters, wherein the character is mapped to a unique location; and
    displaying a visual order of the plurality of characters, wherein the plurality of characters are automatically highlighted and distinguished over non-selected characters of the bidirectional text, wherein the plurality of characters that are highlighted correspond to the plurality of characters that were selected.

14. The method of claim 13, wherein the visual order displays the selected plurality of characters as a single continuous block of characters.

15. The method of claim 13, wherein the bidirectional text includes a combination of at least one of a letter, a symbol, a number, a word, a phrase, or a sentence.

16. The method of claim 13, further comprising:
    receiving a request to select one or more additional characters to be included with the plurality of characters such as to provide an expanded selection of characters; and
    displaying a visual order of the expanded selection of characters, wherein the expanded selection of characters is automatically highlighted.

17. The method of claim 16, wherein a beginning character and an end character that are associated with the expanded selection of characters correspond to the identified head and tail characters.

18. The method of claim 13, wherein the display is a touch screen device.

19. The method of claim 13, wherein the visual order and the logical order of the selected plurality of characters are distinct.

20. The method of claim 13, wherein the identified head and tail characters correspond to a first character and a last character of the selected plurality of characters.

* * * * *